US011611902B2

(12) United States Patent
Yang et al.

(10) Patent No.: US 11,611,902 B2
(45) Date of Patent: Mar. 21, 2023

(54) CONGESTION CONTROL FOR POWER SAVINGS IN USER EQUIPMENT FOR DIRECT LINK COMMUNICATIONS

(71) Applicant: QUALCOMM Incorporated, San Diego, CA (US)

(72) Inventors: Wei Yang, San Diego, CA (US); Tugcan Aktas, La Jolla, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 17/148,000

(22) Filed: Jan. 13, 2021

(65) Prior Publication Data

US 2022/0225161 A1 Jul. 14, 2022

(51) Int. Cl.
 *H04B 17/318* (2015.01)
 *H04L 5/00* (2006.01)
 (Continued)

(52) U.S. Cl.
 CPC ...... *H04W 28/0289* (2013.01); *H04B 17/318* (2015.01); *H04L 5/0098* (2013.01);
 (Continued)

(58) Field of Classification Search
 CPC .... H04B 7/02–17; H04B 17/0082–409; H04L 5/0001–0098; H04W 4/30–80; H04W 8/22–245; H04W 24/02–10; H04W 28/02–26; H04W 48/02–20; H04W 52/02–60; H04W 72/005–14;
 (Continued)

(56) References Cited

U.S. PATENT DOCUMENTS

2019/0200366 A1* 6/2019 Park .................. H04W 4/40
2020/0107330 A1* 4/2020 Chae ................. H04W 24/08
(Continued)

FOREIGN PATENT DOCUMENTS

| EP | 3525539 A1 | 8/2019 |
|---|---|---|
| EP | 3840461 A1 | 6/2021 |
| WO | 2020063525 A1 | 4/2020 |

OTHER PUBLICATIONS

International Search Report and Written Opinion—PCT/US2021/072882—ISA/EPO—dated May 25, 2022.
(Continued)

*Primary Examiner* — Timothy J Weidner
(74) *Attorney, Agent, or Firm* — Arent Fox, LLP

(57) ABSTRACT

Example implementations include a method, apparatus and computer-readable medium of wireless communication over a sidelink between a first user equipment (UE) and a second UE. The first UE may identify a configuration for discontinuous reception (DRX) for direct link communications with a second UE. The first UE may determine a channel busy ratio (CBR) based on a plurality of CBR measurement occasions within a time window prior to a direct link transmission based on the configuration for DRX. The first UE may determine whether to perform a congestion control on the direct link transmission based on the CBR. The first UE may perform a direct link transmission subject to a channel occupancy ratio limit.

26 Claims, 13 Drawing Sheets

(51) Int. Cl.
*H04W 4/40* (2018.01)
*H04W 24/10* (2009.01)
*H04W 28/02* (2009.01)
*H04W 76/28* (2018.01)
*H04W 84/00* (2009.01)
*H04W 88/02* (2009.01)
*H04W 92/02* (2009.01)
*H04W 92/10* (2009.01)
*H04W 92/18* (2009.01)

(52) U.S. Cl.
CPC .............. *H04W 4/40* (2018.02); *H04W 24/10* (2013.01); *H04W 28/0284* (2013.01); *H04W 76/28* (2018.02); *H04W 84/005* (2013.01); *H04W 88/02* (2013.01); *H04W 92/02* (2013.01); *H04W 92/18* (2013.01)

(58) Field of Classification Search
CPC ........... H04W 74/002–0891; H04W 76/10–50; H04W 84/005–22; H04W 88/02–06; H04W 92/02; H04W 92/16; H04W 92/18
See application file for complete search history.

(56) References Cited

U.S. PATENT DOCUMENTS

2021/0051510 A1\* 2/2021 Chae ................. H04W 28/0236
2022/0046648 A1\* 2/2022 Kiilerich Pratas ..........................
 H04W 72/0486
2022/0132418 A1\* 4/2022 Hofmann ............... H04W 76/14

OTHER PUBLICATIONS

Partial International Search Report—PCT/US2021/072882—ISA/EPO—dated Apr. 4, 2022.
Xiaomi: "Discussion on Power Saving and Congestion Control", 3GPP TSG RAN WG1 #103-e, 3GPP Draft, R1-2009039, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, 2 Pages, Oct. 23, 2020 (Oct. 23, 2020), XP051945470, Retrieved from the Internet: URL: https://ftp.3gpp.org/tsg_ran/WG1_RL1/TSGR1_103-e/Docs/R1-2009039.zip R1-2009039.doc [retrieved on Oct. 23, 2020] the whole document.

\* cited by examiner

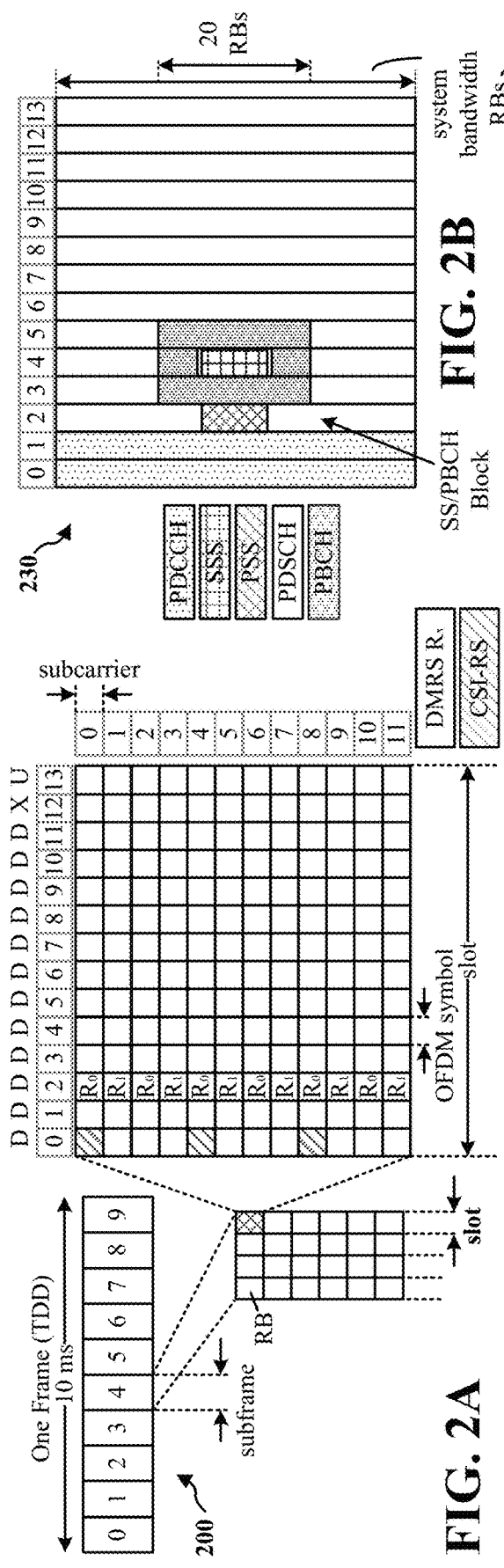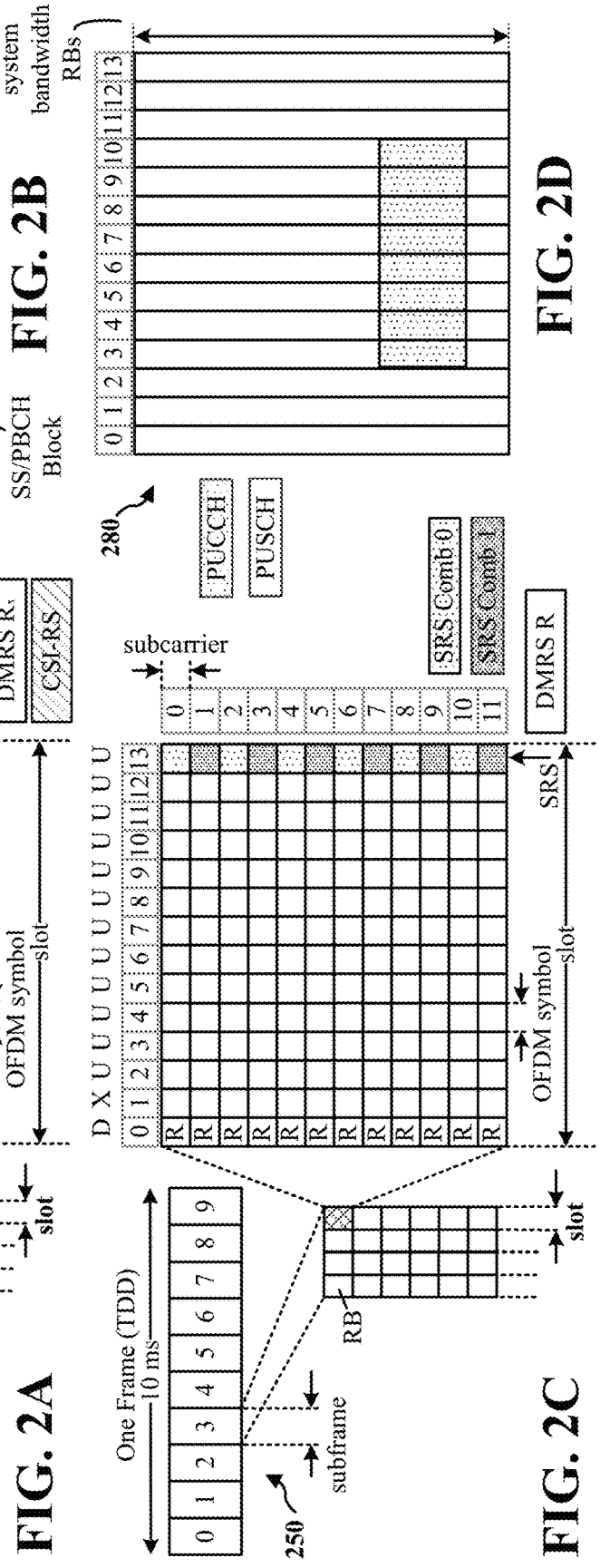

CONGESTION CONTROL FOR POWER SAVINGS IN USER EQUIPMENT FOR DIRECT LINK COMMUNICATIONS

BACKGROUND

Technical Field

The present disclosure relates generally to communication systems, and more particularly, to apparatuses and methods of congestion control for power saving user equipment in direct link communications between two devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3 GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a first user equipment (UE). The method may include identifying a configuration for discontinuous reception (DRX) over sidelink communications. The method may include determining a plurality of channel busy ratio (CBR) measurement occasions based on the configuration for DRX. The method may include determining a CBR based on measurements of the plurality of CBR measurement occasions.

The disclosure also provides an apparatus (e.g., a user equipment) including a memory storing computer-executable instructions and at least one processor configured to execute the computer-executable instructions to perform the above method, an apparatus including means for performing the above method, and a computer-readable medium storing computer-executable instructions for performing the above method.

In an aspect, the disclosure provides a method of wireless communication for a first UE. The method may include identifying a configuration of frequency domain resources for sidelink communications. The configuration may include a first frequency domain resource and a second frequency domain resource. The method may include measuring a received signal strength indicator (RSSI) on the second frequency domain resource during a plurality of CBR occasions within a time window prior to a sidelink transmission on the second frequency domain resource when the second frequency domain resource is not active. The method may include determining a CBR for the second frequency domain resource based on the RSSI for the plurality of CBR measurement occasions.

The disclosure also provides an apparatus (e.g., a user equipment) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of downlink channels within a 5G NR subframe.

FIG. 2C is a diagram illustrating an example of a second 5G NR frame.

FIG. 2D is a diagram illustrating an example of uplink channels within a 5G NR subframe.

DETAILED DESCRIPTION

Figure 1:
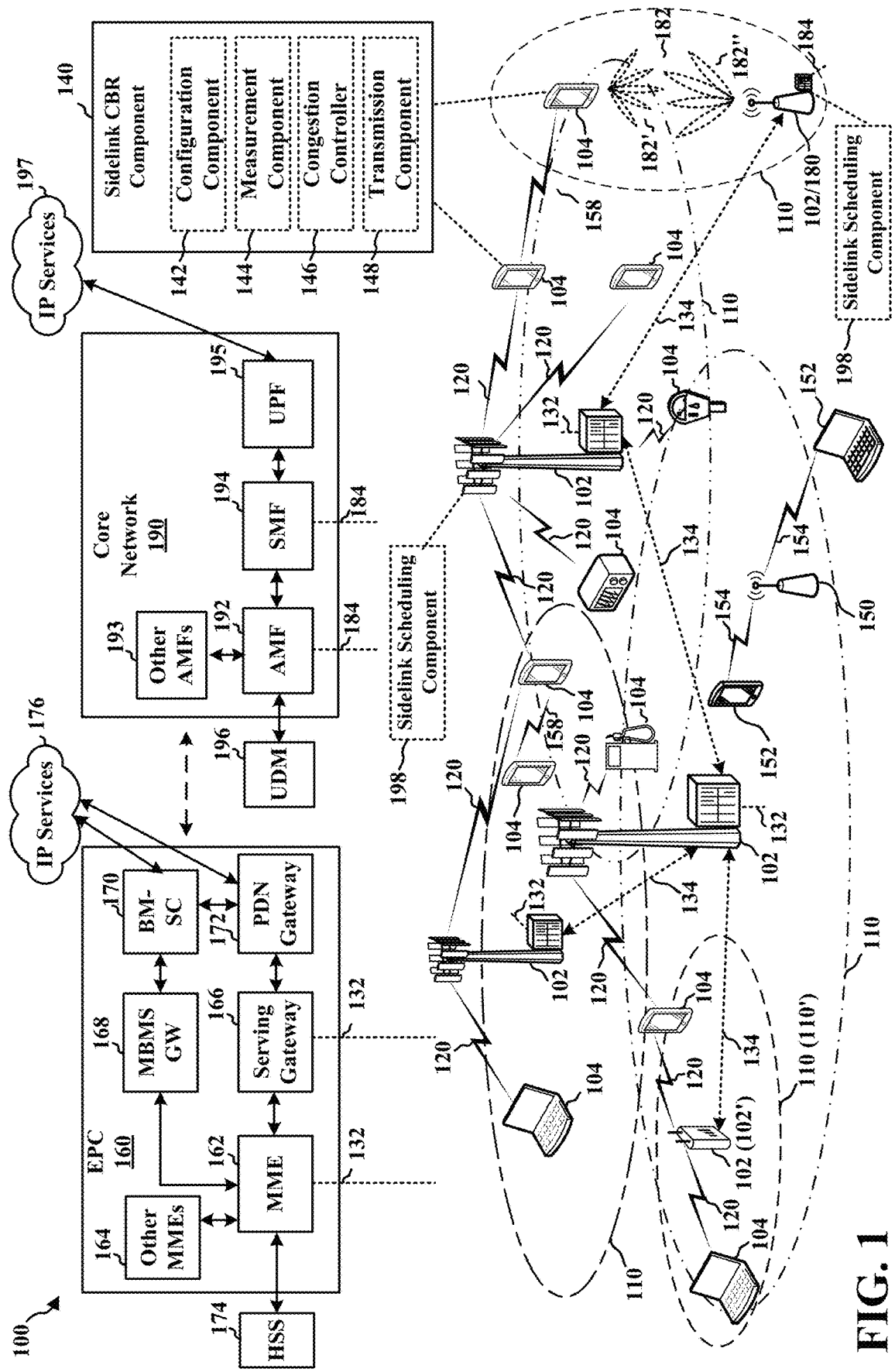
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The described features generally relate to congestion control and power saving for direct link communications of device-to-device (D2D) communication technologies. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to user equipment (UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

One concern with D2D communications is the possibility of congestion if multiple devices are attempting to communicate directly. D2D communications technologies may allow a user equipment (UE) to schedule transmissions subject to congestion control. For example, a channel busy ratio (CBR) may be used as a metric for congestion control. A sidelink or direct link received signal strength indicator (RSSI) may be used for CBR estimation. For example, the CBR may be measured for all subchannels for the direct link transmission over a window prior to the transmission. The UE may then limit a channel occupancy ratio (CR) to be smaller than a configured threshold, based on the measured CBR.

D2D communication technologies intended for use within a vehicle or infrastructure may not be concerned with power consumption due to availability of power from the vehicle or other supply. D2D communication technologies, however, may also be applied to portable devices such as mobile devices that have a limited power supply such as a battery. Accordingly, power saving techniques for D2D communication technologies may desirable.

A UE in communication with another device (e.g., a base station or another UE) may actively monitor a control channel (e.g., a physical downlink control channel (PDCCH) or a physical sidelink control channel (PSCCH)) for a grant scheduling a transmission. When the UE is not actively receiving data, the UE may conserve power by entering a discontinuous reception (DRX) mode in which the UE monitors the control channel during an active time and an on duration of a DRX cycle and may sleep during an off portion of the DRX cycle. That is, the UE may not monitor the control channel during the off portion of the DRX cycle and a base station may avoid transmitting the control channel to the UE during the off portion of the DRX cycle. Another example power saving technique is frequency domain resource adaptation, where the UE may switch to a smaller frequency domain resource to monitor when the UE is not actively transmitting or receiving data.

Power saving techniques have a potential to interfere with congestion control techniques. In particular, because power saving techniques such as DRX and frequency domain resource adaptation limit the resources that the UE monitors, the UE may not be able to measure the RSSI on all resources for a transmission during the window prior to the transmission.

In an aspect, the present disclosure provides techniques for determining a CBR for congestion control when one or more power saving techniques that limit monitored resources are configured. The present disclosure provides for a plurality of CBR measurement occasions that the UE may measure to determine a channel quality metric (e.g., RSSI) for CBR calculations. Some of the CBR measurement occasions may be configured on resources that the UE is not configured to monitor due to the power savings techniques. Accordingly, the UE may be able to determine a CBR for resources on which the UE may perform a direct link transmission. When the UE has data to transmit, the UE may immediately schedule the direct link transmission and determine the CR limits for congestion control without performing additional measurements. Accordingly, the UE may not incur additional latency for performing congestion control when configured with power saving techniques. In an aspect, the RSSI measurement may be less complex than monitoring a control channel and occur less often than constant monitoring without power saving techniques. Accordingly, determining the CBR based on the CBR measurement occasions while still implementing the power savings techniques may also reduce power consumption compared to not using power savings techniques.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a sidelink CBR component 140 that performs congestion control for sidelink communications configured with power savings techniques such as DRX or frequency domain resource adaptation. The sidelink CBR component 140 may include a configuration component 142 that identifies a configuration for DRX for direct link communications with a second UE. In an aspect, the configuration component 142 may identify configuration of a first frequency domain resource and a second frequency domain resource for direct link communications with a second UE. The sidelink CBR component 140 may include a measurement component 144 that determines a CBR based on a plurality of CBR measurement occasions within a time window prior to a direct link transmission based on the configuration for DRX. In an aspect, the measurement component 144 may measure a RSSI on the second frequency domain resource during a plurality of CBR measurement occasions within a time window prior to a direct link transmission on the second frequency domain resource when the second frequency domain resource is not active. The measurement component 144 may determine a CBR for the second frequency domain resource based on the RSSI for the plurality of CBR measurement occasions. The sidelink CBR component 140 may include a congestion controller 146 that determines whether to perform a congestion control on the direct link transmission based on the CBR. The sidelink CBR component 140 may include a transmission component 148 that performs a direct link transmission subject to a channel occupancy ratio limit.

In an aspect, one or more of the base stations 102 may include a sidelink configuration component 198 that is configured to configure the first UE with the DRX configuration, the frequency domain resource configuration, and/or a CBR occasion configuration.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. In an aspect, the D2D communication link 158 may be configured with direct link carrier aggregation for a plurality of component carriers.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency domain duplex (FDD) in which for a particular set of subcarriers (carrier system bandwidth), subframes within the set of subcarriers are dedicated for either DL or UL, or may be time domain duplex (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
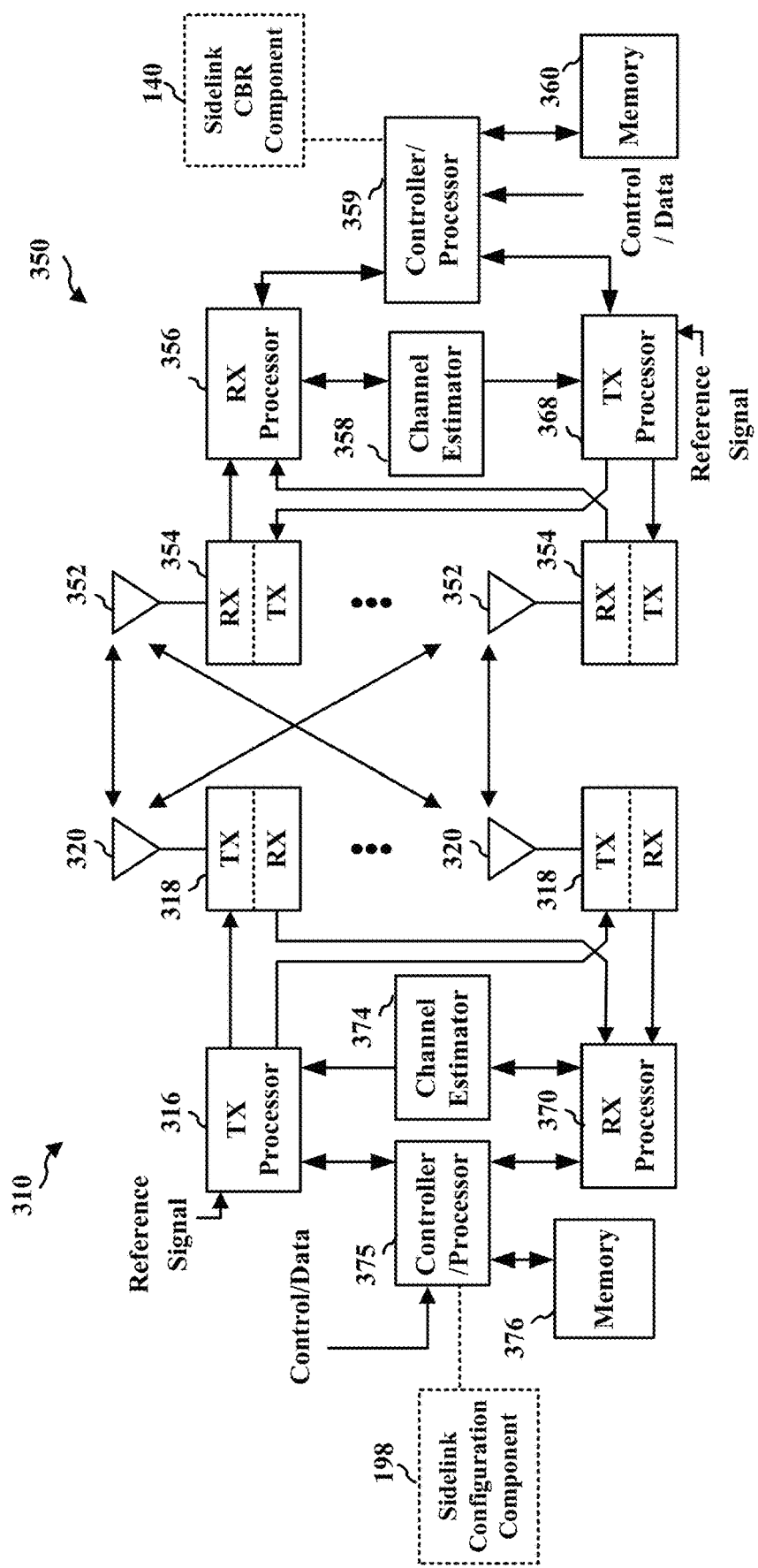
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink CBR component 140 of FIG. 1.

At least one of the TX processor 316, the RX processor 370, and the controller/processor 375 may be configured to perform aspects in connection with the sidelink configuration component 198 of FIG. 1.

Figure 4:
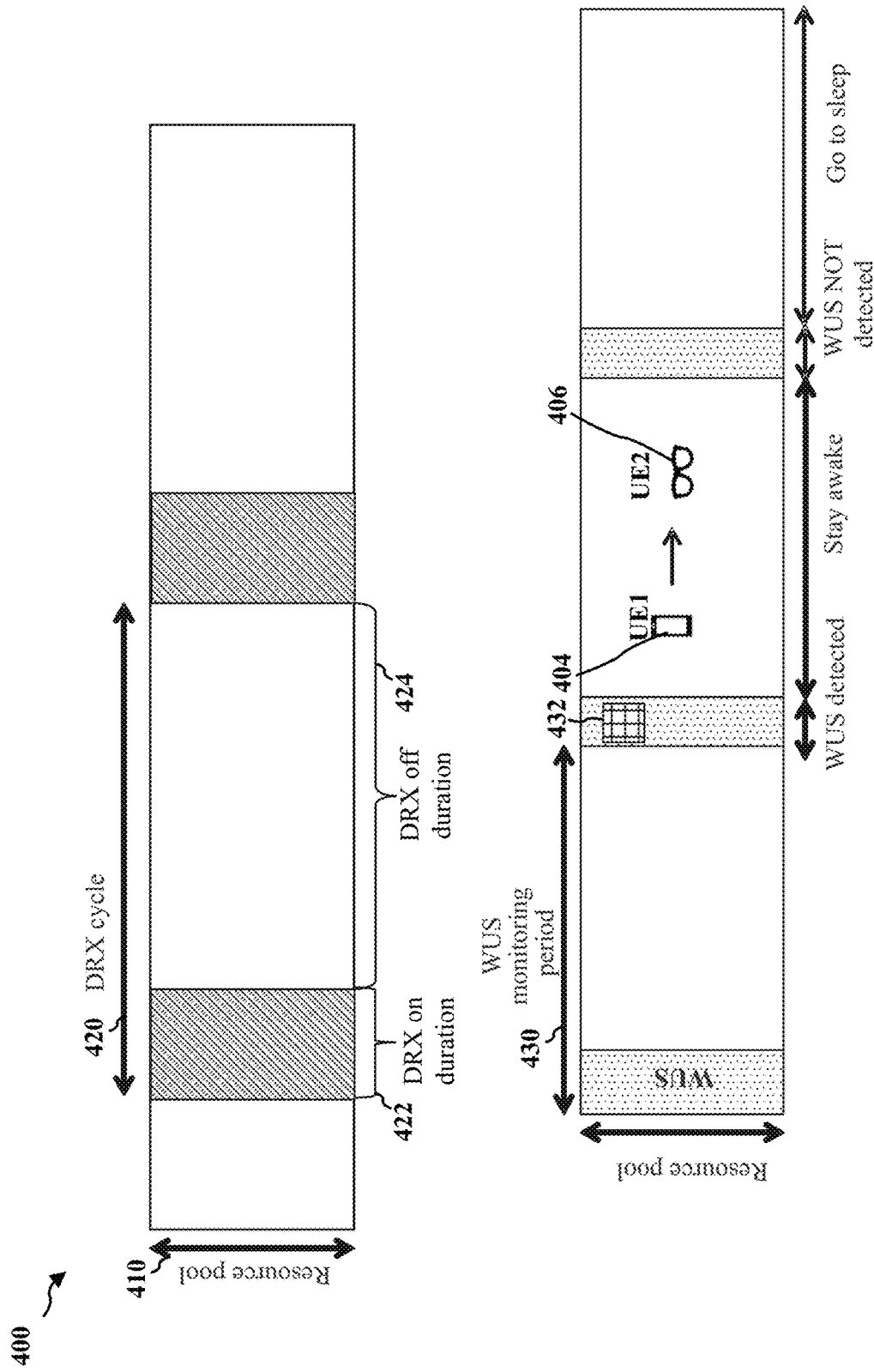
FIG. 4 is a diagram of an example of discontinuous reception (DRX) operation for a direct link between a first UE and a second UE.

FIG. 4 is a diagram 400 illustrating an example of DRX operation for a direct link between a first device 404 (e.g., a UE 104) and a second device 406 (e.g., another UE such as an IoT device). As illustrated, the direct link may provide, for example, unicast communications (i.e., direct communication between UE1 and UE2). Direct link communications may also be applied to other cast types (e.g., group cast and broadcast). For instance, in the broadcast case, UE1 may transmit to all UEs in a vicinity without knowing the identity of each UE. In the frequency domain, the direct link may be over a resource pool 410. In the time domain, a DRX configuration may define a DRX cycle including a DRX on duration 422 and a DRX off duration 424. The DRX configuration may provide for power savings by allowing the UE 104 to sleep during the DRX off duration. In other words, the UE 104 may not monitor direct link control or data channels during the DRX off duration 424.

In an aspect, a wake-up signal (WUS) operation for a direct link between a first device (e.g., UE 104) and a second device may be configured in addition to the DRX operation. A WUS configuration may define a WUS monitoring period 430, which may be the same as the DRX cycle 420. At the start of the WUS period 430, the UE 104 may monitor the resource pool 410 for a WUS 432. If the WUS 432 is detected, the UE 104 may stay awake for the remainder of the DRX on duration 422, then sleep during the DRX off duration 424 as discussed above. If the WUS 432 is not detected, the UE 104 may sleep for the remainder of the WUS monitoring period 430. That is, the UE 104 may not enter the DRX on duration 422 if the WUS 432 is not detected.

Figure 5:
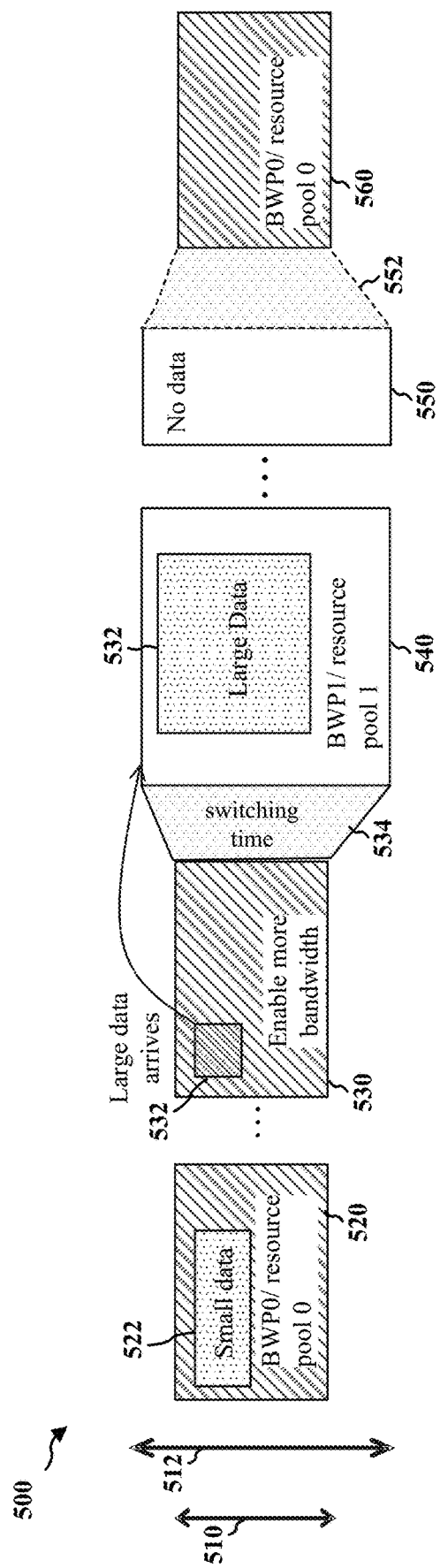
FIG. 5 is a diagram of an example of frequency domain resource switching operation.

FIG. 5 is a diagram 500 illustrating an example of frequency domain resource switching. A "frequency domain resource" may refer to any identification of an allocation of resources in the frequency domain such as a bandwidth part (BWP), resource pool, or component carrier. Frequency domain resource switching may provide power savings by switching the UE to a smaller frequency domain resource based on transmission/reception load. For example, the UE 104 may be configured with a first frequency domain resource 510 and a second frequency domain resource 512. The second frequency domain resource 512 may be larger than the first frequency domain resource 510. In some implementations, the first frequency domain resource 510 may be a subset of the second frequency domain resource 512. In an aspect, the UE 104 may be configured with direct link carrier aggregation in which the UE 104 is configured with a plurality of component carriers. Each component carrier may be configured with one or more frequency domain resources.

The first frequency domain resource 510 may be active, for example, in a slot 520. The UE 104 may receive a small amount of data 522 from higher layers and transmit the small amount of data 522 via the first frequency domain resource 510. For example, the small amount of data 522 may be less than a maximum transport block size for the first frequency domain resource 510. If a large amount of data 532 (e.g., greater than the maximum transport block size for the first frequency domain resource 510) arrives from higher layers in a slot 530, the UE 104 may switch to the second frequency domain resource 512. After a switching time 534, which may be zero or more slots, the UE 104 may transmit the large amount of data 532 in one or more slots 540 over the second frequency domain resource 512. If the UE 104 receives no data or a small amount of data from the higher layers during a time duration 550, the UE 104 may switch to the first frequency domain resource 510 after a switching time 552 (e.g., zero or more slots) for use in a subsequent slot 560.

Figure 6:
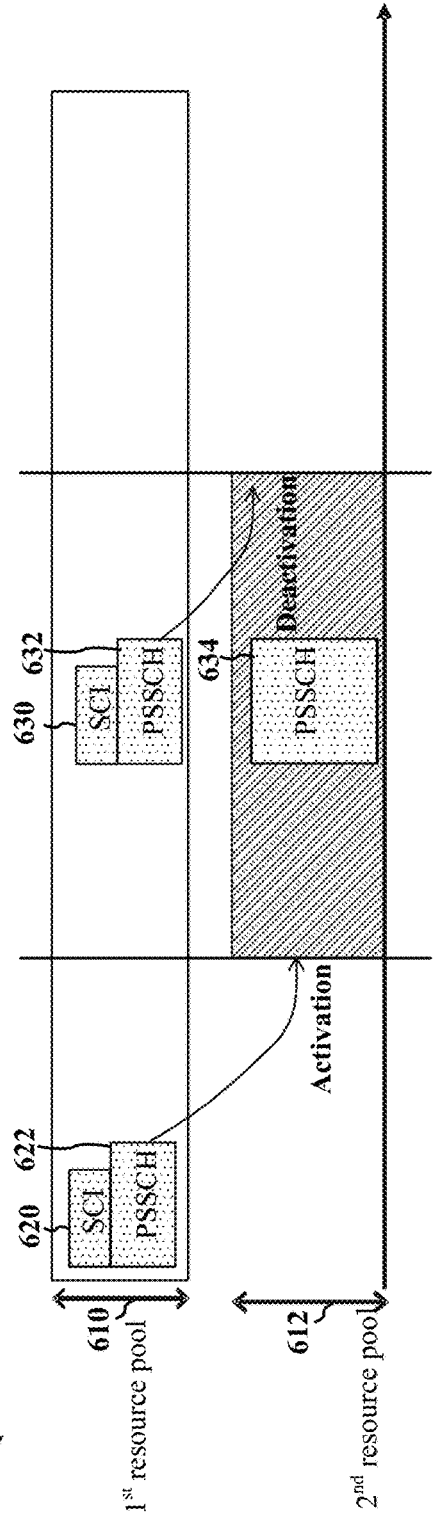
FIG. 6 is a diagram of another example of frequency domain resource switching operation including receiving an activation of a second frequency domain resource.

FIG. 6 is a diagram 600 illustrating another example of frequency domain resource switching by receiving an activation of a second frequency domain resource. In this example, the UE 104 may be configured with a first frequency domain resource 610 and a second frequency domain resource 612. The UE 104 may receive a sidelink control information (SCI) 620 on the first frequency domain resource 610 that schedules a physical sidelink shared channel (PSSCH) 622. The SCI 620 and/or the PSSCH 622 may activate the second frequency domain resource 612. For example, the PSSCH may include a media access control (MAC) control element (MAC-CE) that activates the second frequency domain resource 612. The UE 104 may then receive a second SCI 630 that schedules a PSSCH 632 on the first frequency domain resource 610 and/or a PSSCH 634 on the second frequency domain resource 612. The second SCI 630, the PSSCH 632, and/or the PSSCH 634 may deactivate the second frequency domain resource 612. Accordingly, the second frequency domain resource 612 may be dynamically activated and deactivated as needed. The UE 104 may save power by not monitoring the deactivated second frequency domain resource 612.

In an aspect, with any of a DRX configuration, a WUS configuration, or frequency domain resource switching, a UE may spend a significant amount of time in a sleep mode for at least some resources in order to save power. Direct link communications may include congestion control. For example, a channel busy ratio (CBR) may be used as a metric for congestion control. A UE 104 may measure the CBR to determine whether the medium is busy, and the UE 104 may limit resource utilization of the UE 104 by limiting a channel occupancy ratio (CR) to be smaller than a configured threshold, based on the measured CBR. Conventional definitions of CBR may be based on a received signal strength indicator (RSSI) for all subchannels during a time period of [n−100, n−1] slots prior to a transmission starting at slot n. In an aspect, because the UE 104 may schedule direct link transmissions as data becomes available, a CBR measurement according to a conventional definition may imply that the UE 104 is to constantly measure the CBR in order to have a valid CBR measurement at slot n. A UE may not be able to utilize power saving techniques such as DRX and WUS if the UE is constantly measuring RSSI in order to determine CBR. Similarly, for frequency domain power savings, conventional CBR measurement may prevent the UE from switching to a smaller bandwidth frequency domain resource due to monitoring of all frequency domain resources for CBR.

Figure 7:
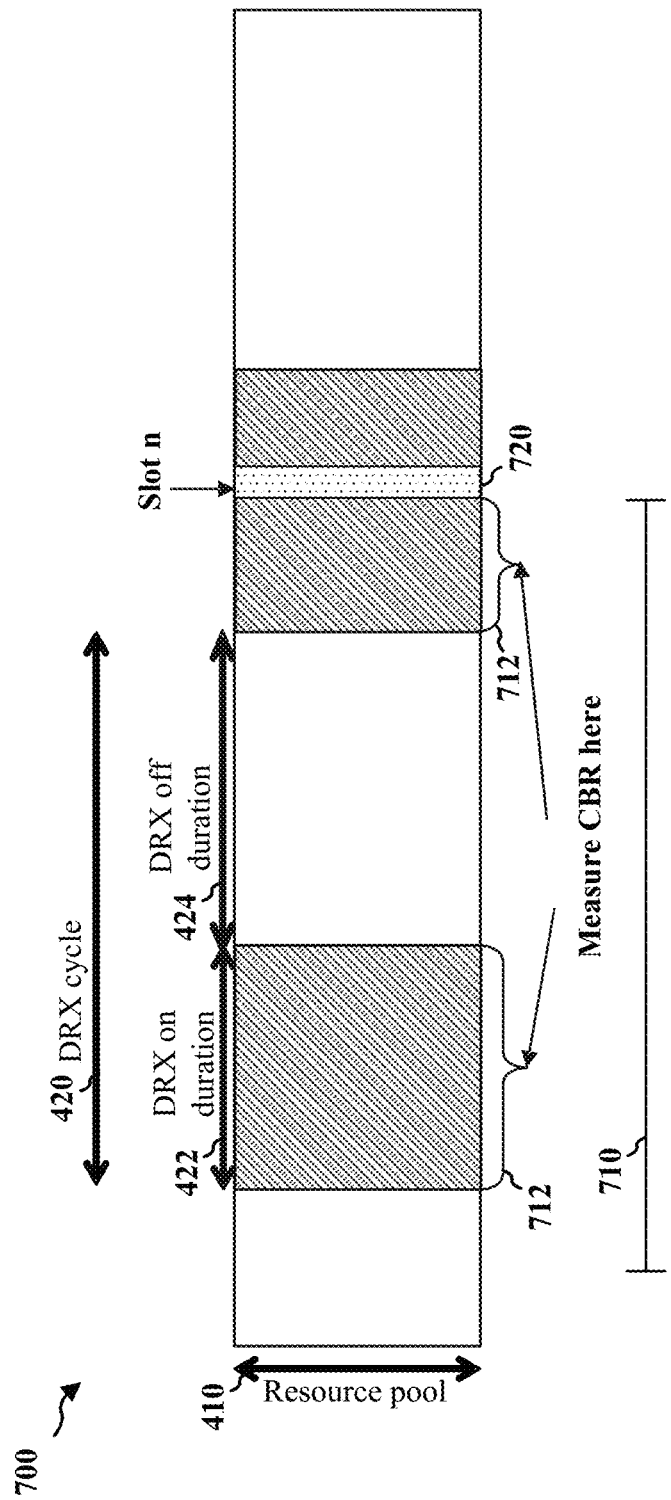
FIG. 7 is a diagram of an example channel busy ratio (CBR) measurement based on a DRX configuration of a UE.

FIG. 7 is a diagram 700 of a CBR measurement based on a DRX configuration of a UE 104. The UE 104 may be configured with the DRX cycle 420 including the DRX on duration 422 and the DRX off duration 424. A plurality of CBR measurement occasions 712 may be defined based on the DRX cycle 420. For example, the CBR may be defined as the channel busy ratio (i.e., SL-RSSI>threshold) measured on CBR measurement occasions 712 during the DRX on duration 422 within a measurement window 710 before a transmission slot 720 (e.g., slot n). The measurement window 710 may be the time period of [n−100, n−1] or may be extended. For example, the measurement window 710 may include a number of slots within the DRX on duration equal to the duration of the time period [n−100, n−1] (i.e., 100 slots). If the UE 104 is configured to monitor a WUS, the UE 104 may only measure CBR during the DRX on durations in which the UE is awake. In other words, the CBR may be defined using the slots in which the UE is in an awake state (determined by both the DRX and WUS). In an aspect, this definition of CBR may be more effective when the DRX configuration of multiple UEs are aligned. For example, for two pairs of communicating UEs, the DRX on duration 422 may either fully overlap or be fully orthogonal. In the case of overlapping DRX on durations, the CBR measurement within the DRX on duration may accurately indicate congestion that may be experienced during a transmission. In the case of orthogonal DRX on durations, although the CBR measurement may not include transmissions of the other pair of UEs, such transmissions may not contribute to congestion during the DRX on duration.

Figure 8:
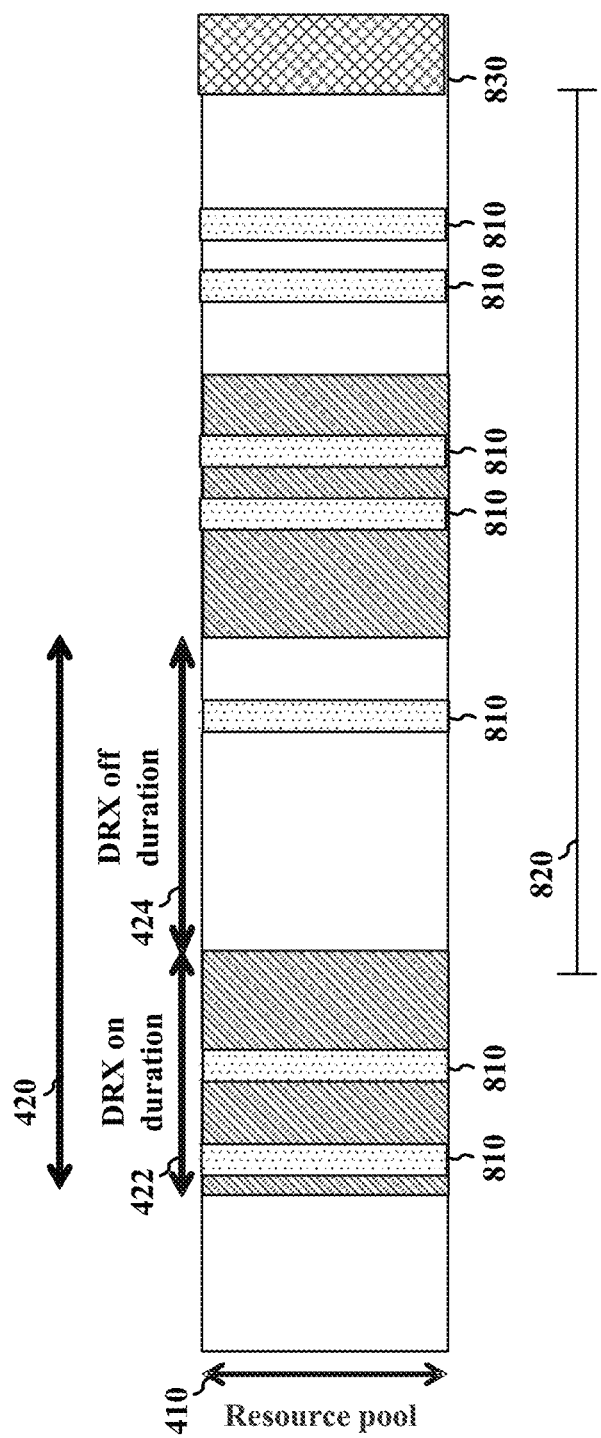
FIG. 8 is a diagram of an example CBR measurement over a plurality of CBR measurement occasions.

FIG. 8 is a diagram 800 of a CBR measurement over a plurality of CBR measurement occasions 810. The UE 104 may be configured with the DRX cycle 420 including the DRX on duration 422 and the DRX off duration 424. The UE 104 may be configured with a plurality of CBR measurement occasions 810. The configuration of the CBR measurement occasions 810 may be received from a base station or another UE. In some implementations, the CBR measurement occasions 810 may be configured by the UE 104 to meet a minimum monitoring requirement. For example, the UE 104 may determine a configuration of CBR measurement occasions 810 that guarantees that at least a minimum number of slots are measured within a time window 820 of a given length (e.g., 100 ms/slots). The minimum number may be expressed as a percentage (e.g., X %). For example, for any slot n, the UE 104 may be configured to measure at least X slots between [n−100, n−1]. Accordingly, when the UE 104 determines to perform a transmission 830, the UE 104 may satisfy a CBR measurement requirement. In an aspect, the UE 104 may independently select the slots for the configuration of CBR measurement occasions 810 that meet the X % requirement. Because each UE selects the CBR measurement occasions 810 independently (e.g., randomly), the probability that the UE 104 is able to measure the activity of another UE may be maximized. Thus, the CBR calculation based on the measurements may be more accurate than preconfigured CBR measurement occasions. In contrast, if all UEs use the same CBR measurement occasions, then all of the UEs may effectively "receive" during these slots, and none of the UEs may be transmitting. Therefore, one or more UEs may erroneously determine that the medium is free or uncongested.

In an aspect, the CBR measurement occasions 810 can be periodic (e.g., every Y slots). If the periodic measurements correspond to periodic transmissions, the periodic CBR measurement occasions may provide an accurate measurement of congestion that may be experienced during a periodic transmission. In another aspect, the CBR measurement occasions 810 may follow a pseudo-random pattern. Pseudo-random selection of the CBR measurement occasions 810 may avoid measuring or missing a periodic transmission. As such, pseudo-random selection of the CBR measurement occasions 810 may provide a more accurate CBR for arbitrary transmissions.

As illustrated, some of the CBR measurement occasions 810 may occur outside of the DRX on duration 422 (i.e., during the DRX off duration 424). For these CBR measurement occasions 810, the UE 104 may wake up to measure RSSI. In an aspect, an RSSI measurement may consume less power than a full reception and decoding procedure for monitoring a control channel.

The CBR measurement occasions 810 may be spread out over a longer period of time than conventional CBR measurements. More recent CBR measurements may more accurately reflect congestion at the time of a transmission. In an aspect, instead of determining a mean CBR measurement over the window 820, the CBR value may be determined by filtering a plurality of CBR measurements based on a filter coefficient applied to a previous CBR value. For example, in some implementations, the filter may be expressed by the equation:

$$CBR(n)=\alpha*CBR(n-1)+(1-\alpha)*CBR_{ins}(n-1) \quad (1)$$

where CBR(n) is the CBR value at slot n, $CBR\_ins(n-1)$ is the instantaneous CBR measured on slot n−1, and a is a filter coefficient with a value between 0 and 1. If the UE performs a channel measurement during slot n−1, $CBR\_ins$ (n−1) is given by the ratio of subchannels in slot n−1 where the SL-RSSI is greater than a configured threshold. Otherwise, if the UE does not perform channel measurement during slot n−1, $CBR\_ins(n-1)$ is equal to CBR(n−1). Therefore CBR(n) is equal to CBR(n−1) when no measurement is performed in slot n−1. The use of a filter to determine the CBR for a slot may allow the UE 104 to increase the number of measurements used in the CBR calculation compared to an average over a fixed time window. If the window is kept fixed (e.g., 100 slots), but the UE 104 only measures X % of the slots, then the CBR may be determined based on measurement of only X slots. In contrast, the filter based approach allows the UE 104 to use more measurement information, and also emphasizes the most recent measurements.

Figure 9:
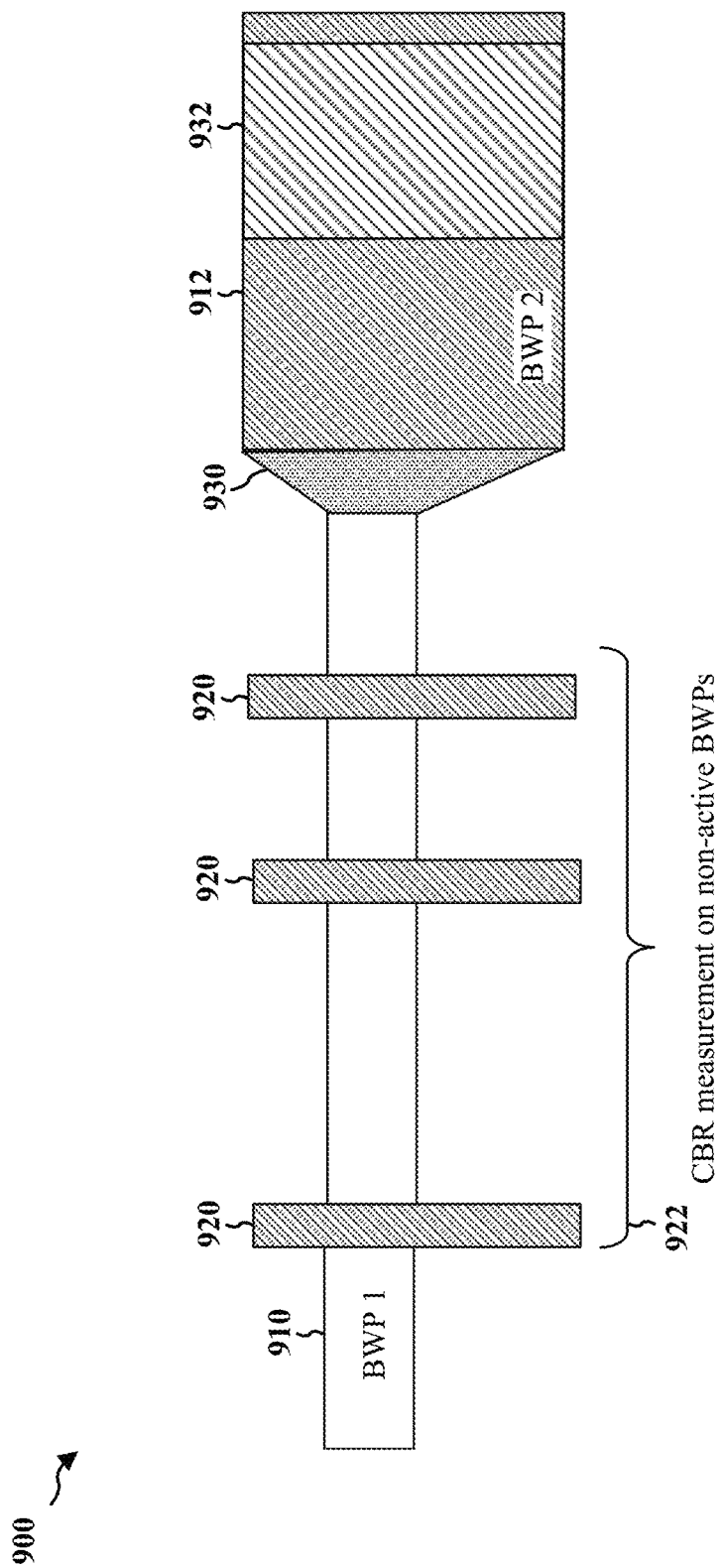
FIG. 9 is a diagram illustrating an example of CBR measurements with frequency domain resource switching.

FIG. 9 is a diagram 900 illustrating an example of CBR measurements with frequency domain resource switching. For example, the UE 104 may be configured with a first frequency domain resource 910 (e.g., BWP 1 or resource pool 1) and a second frequency domain resource 912 (e.g. BWP 2 or resource pool 2). The second bandwidth resource 912 may be larger than the first frequency domain resource 910. In some implementations, the first frequency domain resource 910 may be a subset of the second frequency domain resource 912. The UE 104 may be configured with CBR measurement occasions 920 outside of the active frequency domain resource for the UE to measure CBR. For example, when the first frequency domain resource 910 is active, the UE 104 may measure RSSI on the second frequency domain resource 912 on the CBR measurement occasions 920 during a time window 922. That is, the UE 104 may receive a signal over the second frequency domain resource 912 and determine the RSSI. When the UE 104 has a large amount of data to transmit or the UE 104 receives a switching signal from another UE, the UE 104 may switch to the second frequency domain resource 912. The UE 104 may transmit a transmission 932 on the second frequency domain resource 912 after a switching time 930. The UE 104 may also measure RSSI on the second frequency domain resource 912 when the second frequency domain resource 912 is active. In an aspect, a switching time for measuring RSSI during CBR measurement occasions 920 may be less than the switching time 930 due to the simplicity of RSSI measurement. The switching time for measuring RSSI during CBR measurement occasions 920 may be planned based on the configuration of the CBR measurement occasions 920 and may occur when the first frequency domain resource 910 is active.

Similar to the DRX case, the CBR measurement occasions 920 may be configured by a base station (e.g., gNB), by another UE (e.g., a host device or a relay), or by the UE 104 itself. The CBR measurement occasions 920 may be configured to meet a minimum monitoring requirement. For example, the UE 104 may determine a configuration of CBR measurement occasions 920 that guarantees that at least the minimum number of slots are measured within a time window 820 of a given length (e.g., 100 ms/slots). For example, for any slot n, the UE 104 may be configured to measure at least X slots between [n−100, n−1]. Accordingly, when the UE 104 determines to perform a transmission 932 on the second frequency domain resource 912, the UE 104 may satisfy a CBR measurement requirement.

In an aspect, the CBR measurement occasions 920 can be periodic (e.g., every Y slots). If the periodic measurements correspond to periodic transmissions, the periodic CBR measurement occasions may provide an accurate measurement of congestion that may be experienced during a periodic transmission. In another aspect, the CBR measurement occasions 920 may follow a pseudo-random pattern. Pseudo-random selection of the CBR measurement occasions 920 may avoid measuring or missing a periodic transmission. As such, pseudo-random selection of the CBR measurement occasions 920 may provide a more accurate CBR for arbitrary transmissions.

The filter-based calculation of the CBR value described above may also be used with the CBR measurement occasions 920. Similar the CBR measurement occasions 810, the CBR measurement occasions 920 may be spread out over a longer period of time than a fixed window. The use of a filter to determine the CBR for a slot may allow the UE 104 to increase the number of measurements used in the CBR calculation compared to an average over the fixed time window. If the window is kept fixed (e.g., 100 slots), but the UE 104 only measures X % of the slots during CBR measurement occasions 920, then the CBR may be determined based on measurement of only X slots. In contrast, the filter based approach allows the UE 104 to use more measurement information, and also emphasizes the most recent measurements.

Figure 10:
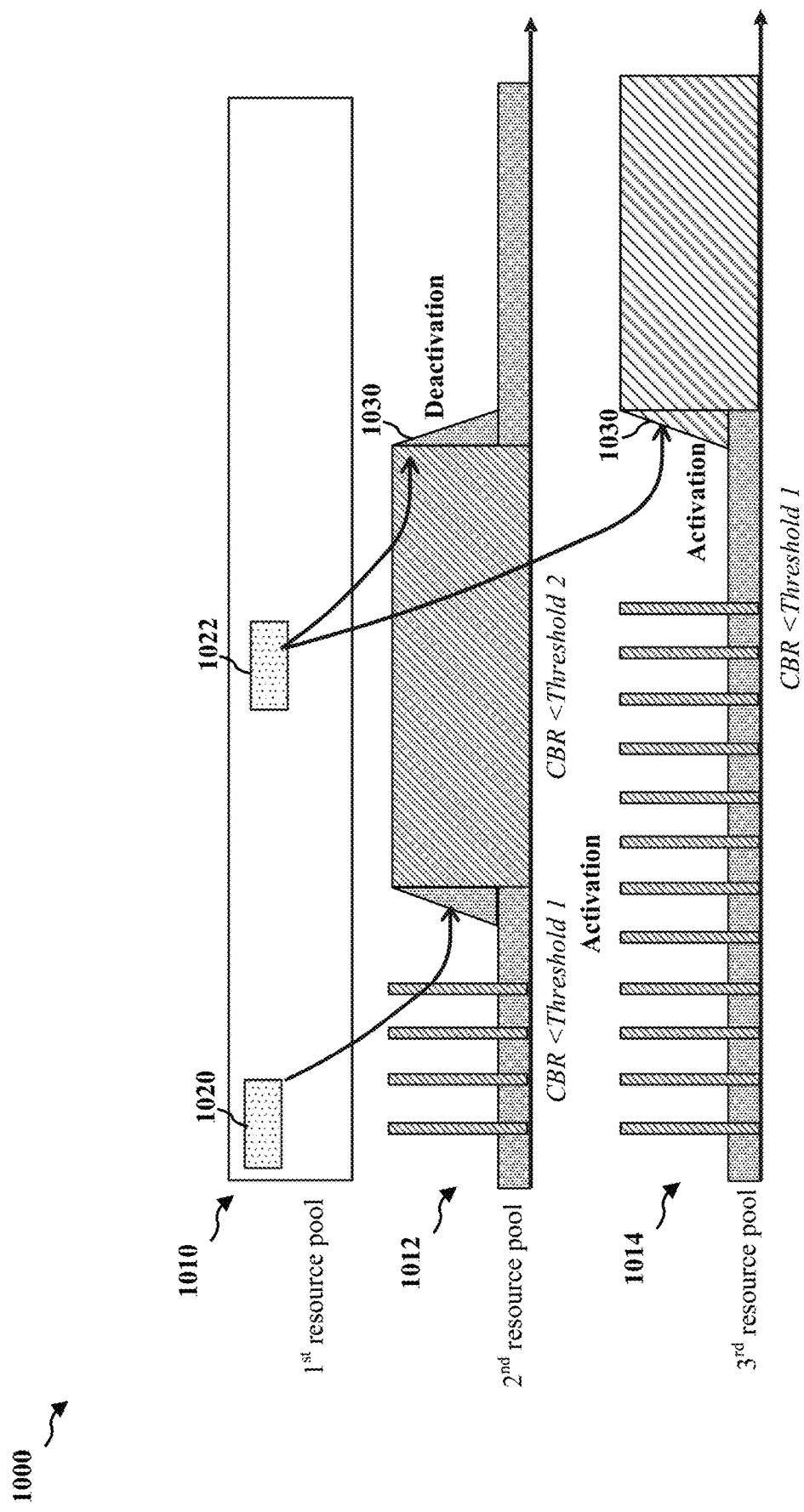
FIG. 10 is a diagram illustrating an example of resource switching based on CBR measurements.

FIG. 10 is a diagram illustrating resource switching based on CBR measurements. In an aspect, a UE 104 may be configured with multiple frequency domain resources (e.g., first frequency domain resource 1010, second frequency domain resource 1012, and third frequency domain resource 1014). The UE 104 may be configured with CBR measurement occasions for each inactive frequency domain resource as discussed above regarding FIG. 9. The UE 104 may select a new frequency domain resource to activate based on the CBR measurement for an inactive frequency domain resource. For example, the UE 104 may select the new frequency domain resource to activate if the measured CBR value for the new frequency domain resource is less than a threshold. Conversely, the UE 104 may deactivate an active frequency domain resource if the measured CBR value for the active frequency domain resource is greater than a second threshold. In an aspect, the UE 104 may transmit an activation signal 1020 or an activation/deactivation signal 1022 when switching frequency domain resources. The activation signal 1020 or an activation/deactivation signal 1022 may inform another UE which frequency domain resource to use for subsequent transmissions.

The UE 104 may maintain at least one active frequency domain resource. For example, the UE 104 may be configured with a primary frequency domain resource (e.g., the first frequency domain resource 1010) that remains active while other frequency domain resources (e.g., the second frequency domain resource 1012 and the third frequency domain resource 1014) are dynamically activated or deactivated. In another implementation, the UE 104 may switch from an active frequency domain resource (e.g., the second frequency domain resource 1012) to an inactive frequency domain resource (e.g., the third frequency domain resource 1014) by deactivating the active frequency domain resource and activating the inactive frequency domain resource during a switching time 1030.

Figure 11:
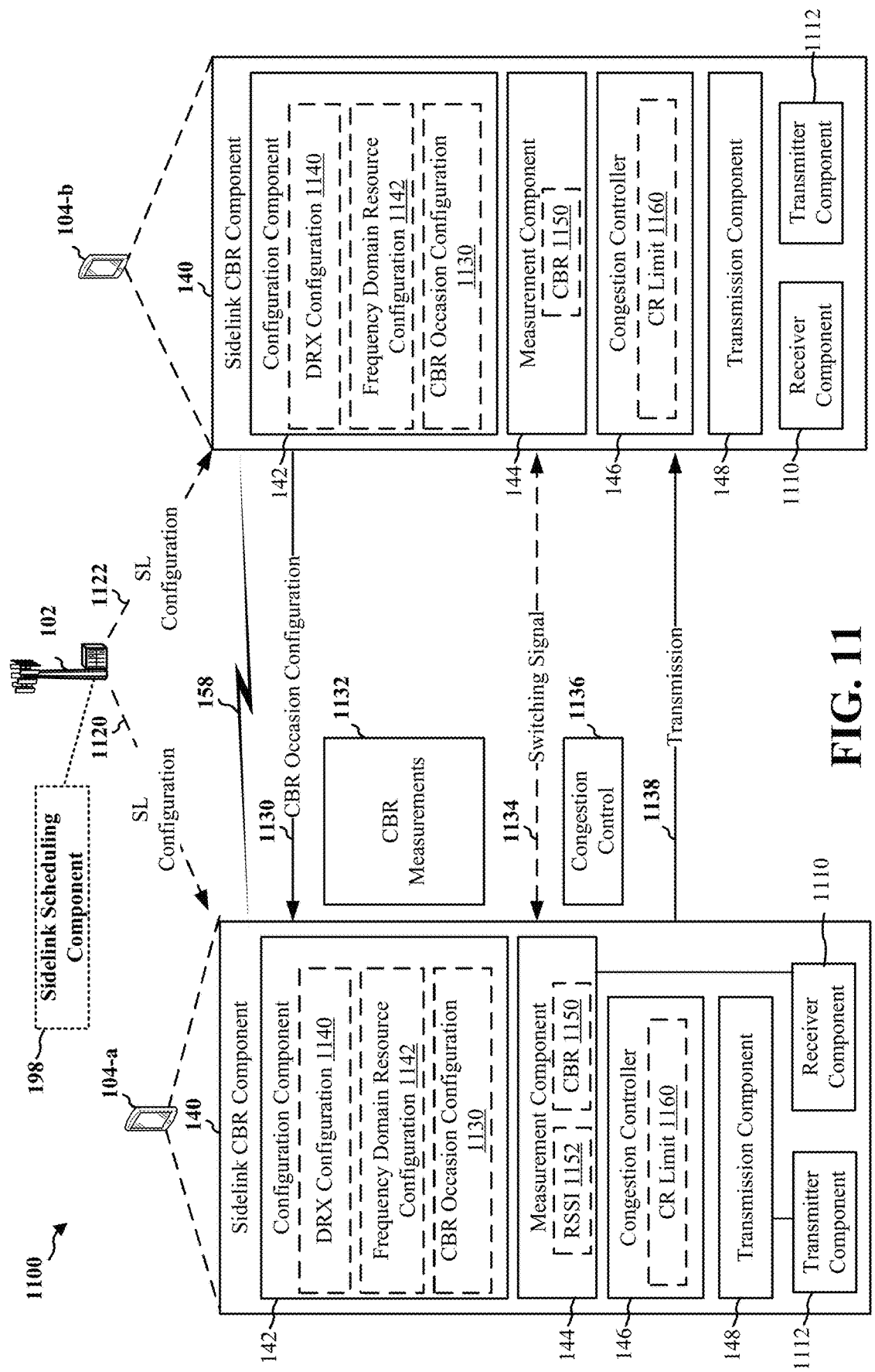
FIG. 11 is a diagram illustrating example communications and components of a base station, a first transmitting UE and a second receiving UE.

FIG. 11 is a diagram 1100 illustrating example communications and components of a base station 102, a first UE 104-a, and a second UE 104-b. The UEs 104-a and 104-b may each include a sidelink CBR component 140. The first UE 104-a may be a sidelink transmitting UE and the second UE 104-b may be a sidelink receiving UE. As discussed above regarding FIG. 1, the first UE 104-a may include the configuration component 142, the measurement component 144, the congestion controller 146, and the transmission component 148. The UE 104 may also include a receiver component 1110 and a transmitter component 1112. The receiver component 1110 may include, for example, a RF receiver for receiving the signals described herein. The transmitter component 1112 may include, for example, an RF transmitter for transmitting the signals described herein. In an aspect, the receiver component 1110 and the transmitter component 1112 may be implemented as a transceiver.

The base station 102 may include the sidelink configuration component 198. The base station 102 may transmit a SL configuration 1120 to the first UE 104-a and transmit a sidelink configuration 1122 to the second UE 104-b. For example, the sidelink configurations 1120, 1122 may be radio resource control (RRC) messages, media access control (MAC) control elements (CE), or downlink control information (DCI) carried on a PDCCH. The configuration component 142 at each of the first UE 104-a and the second UE 104-b may receive the respective sidelink configuration 1120, 1122.

The first UE 104-a and the second UE 104-b may communicate via the communication link 158, which may be referred to as a direct link or the sidelink. In an aspect, the first UE 104-*a* may monitor the communication link 158 by performing CBR measurements 1132 to determine a CBR value. The first UE 104-*a* may optionally transmit a switching signal 1134 indicating a change in frequency domain resources or receive the switching signal 1134 indicating that the second UE 104-*b* has changed the frequency domain resources. The first UE 104-*a* may perform congestion control 1136 by limiting the CR (channel occupancy ratio) of a transmission 1138 to be smaller than a configured threshold, based on the measured CBR value. In an aspect, the SL configuration 1120 may include a power saving configuration such as a DRX configuration, a WUS configuration, or a frequency domain resource configuration including multiple frequency domain resources (e.g., bandwidth parts or resource pools).

The configuration component 142 of the first UE 104-*a* may identify a configuration for direct link communications. For example, the first UE 104-*a* may receive the SL configuration 1120 from the base station 102. In another aspect, the first UE 104-*a* may identify a configuration (e.g., a default configuration) based on a standards document or regulation. In another aspect, the first UE 104-*a* may receive a sidelink configuration from another UE (e.g., UE 104-*b*), which may forward the sidelink configuration from a base station. In an aspect, the configuration component 142 may identify a configuration for DRX (e.g., DRX configuration 1140) for direct link communications with the second UE 104-*b*. For example, the DRX configuration 1140 may define the DRX cycle 420, DRX on duration 422, and/or DRX off duration 424. The DRX configuration 1140 may also include a WUS monitoring period 430. In an aspect, the configuration component 142 may identify a frequency domain resource configuration 1142. The frequency domain resource configuration 1142 may include a configuration of a first frequency domain resource and a second frequency domain resource for direct link communications with the second UE 104-*b*. For example, the configuration may define a first frequency domain resource 510, 610, 910, or 1010 and a second frequency domain resource 512, 612, 912, or 1012. The frequency domain resource configuration 1142 may also define a third frequency domain resource 1014. The frequency domain resource configuration 1142 may indicate whether each configured frequency domain resource is activated or deactivated.

The configuration component 142 may also identify a CBR occasion configuration 1130. For example, the CBR occasion configuration 1130 may be received within the SL configuration 1120 or in other signaling from the base station 102. As another example, the configuration component 142 may receive the CBR occasion configuration 1130 from another UE such as the second UE 104-*b*. As another example, the UE 104-*a* and/or the configuration component 142 may determine the CBR occasion configuration 1130 according to rules defined in a standards document or regulation. In an aspect, some parameters of the rule (e.g., a value of X) may be signaled by the base station 102 and/or the second UE 104-*b*. The CBR occasion configuration 1130 may define the CBR measurement occasions 810 or 920.

The measurement component 144 may perform the CBR measurements 1132 based on the CBR occasion configuration 1130. In particular, the measurement component 144 may measure an RSSI during the CBR measurement occasions 810 or 920. The measurement component 144 may perform the CBR measurements on time domain resources and/or frequency domain resources where the UE 104-*a* is not configured to receive a transmission. For example, the measurement component 144 may perform CBR measurements on CBR measurement occasions 810 during a DRX off duration 424 or perform CBR measurements on CBR measurement occasions 920 on an inactive frequency domain resource.

The congestion controller 146 may determine whether to perform a congestion control on the direct link transmission 1138 based on the CBR. For example, the congestion controller 146 may determine a CR limit 1160 based on the CBR. The congestion controller 146 may limit parameters of the transmission 1138 to ensure that a CR of the transmission 1138 is less than the CR limit 1160. For instance, the CR limit 1160 may be defined as a fraction of sub-channels used for transmission in [n−a, n−1] and granted/reserved in [n, n+b], where a is positive and b is a non-negative integer; a+b+1=1000; and a>=500. The value n+b should not exceed the last transmission opportunity of the grant for the transmission 1138. For example, the congestion controller 146 may limit one or more of modulation and coding scheme (MCS) tables or indices, a number of sub-channels, a number of retransmissions, or a transmission power in order to satisfy the CR limit 1160.

The transmission component 148 may transmit the transmission 1138 based on the congestion control determined by the congestion controller 146. For instance, the transmission component 148 may select the MCS, the number of sub-channels, the number of retransmissions, and the transmission power based on the congestion control. The transmission component 148 may transmit the transmission 1138 via the transmitter component 1112.

Figure 12:
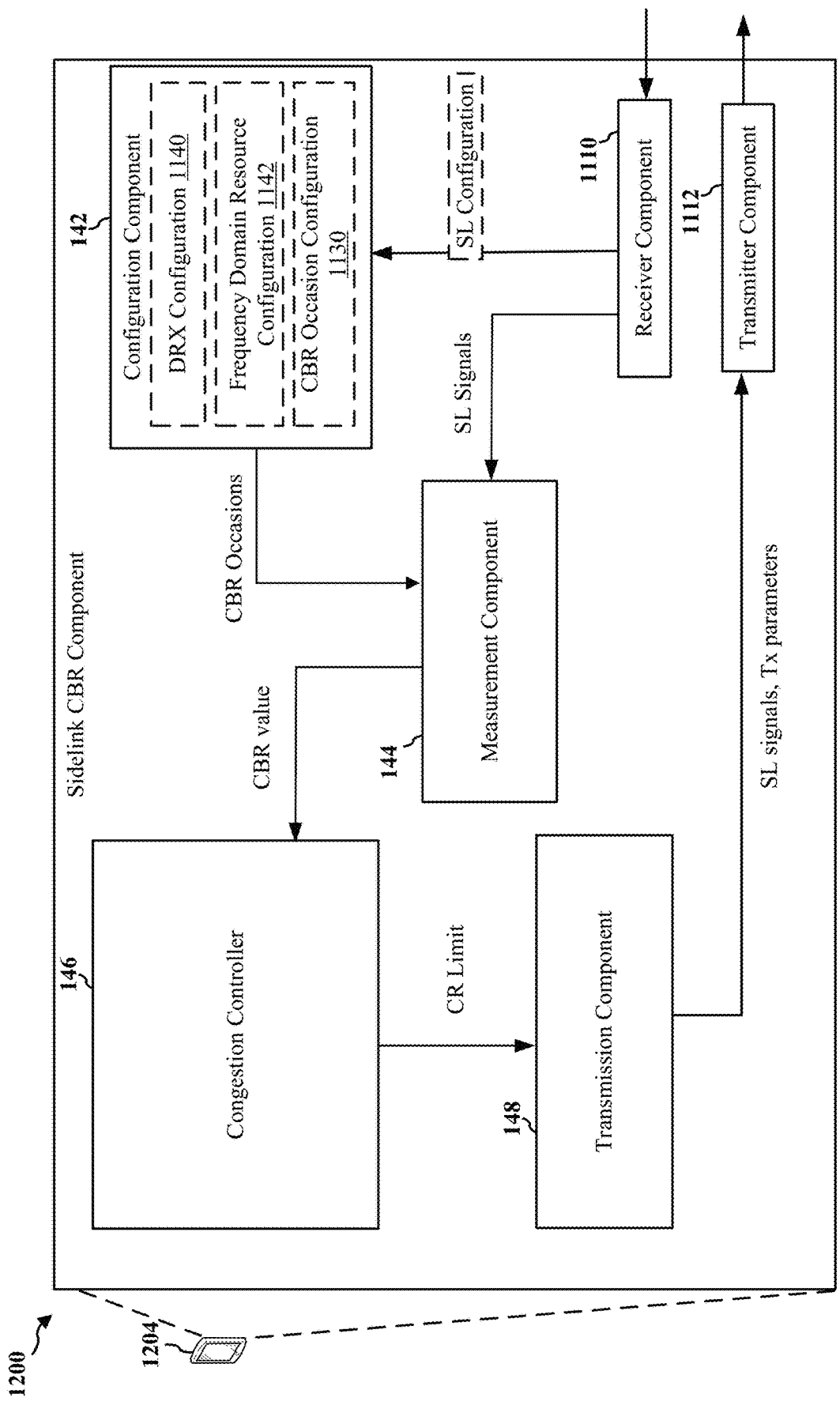
FIG. 12 is a conceptual data flow diagram illustrating the data flow between different means/components in an example UE.

FIG. 12 is a conceptual data flow diagram 1200 illustrating the data flow between different means/components in an example UE 1204, which may be an example of the UE 104 including the sidelink CBR component 140.

The receiver component 1110 may receive downlink signals such as the SL configuration 1120 and/or the CBR occasion configuration 1130. The receiver component 1110 may pass configuration messages to the configuration component 142. The receiver component 1110 may receive sidelink signals such as PSCCH, PSSCH, and PSFCH, which may be intended for the UE 1204 or another UE. The receiver component 1110 may pass the sidelink signals to the measurement component 144.

The configuration component 142 may receive the SL configuration 1120 and/or the CBR occasion configuration 1130 from the receiver component 1110. The configuration component 142 may decode a received configuration and provide configuration information (e.g., CBR measurement occasions) to the measurement component 144.

The measurement component 144 may receive the CBR measurement occasions from the configuration component 142. The measurement component 144 may receive the sidelink signals from the receiver component 1110. The measurement component may perform an RSSI measurement on the sidelink signals during the CBR measurement occasions. The measurement component 144 may further determine a CBR value based on the RSSI measurements. For example, the measurement component 144 may determine an average number of sub-channels occupied during a measurement window 710. As another example, the measurement component 144 may determine a weighted CBR by filtering a plurality of CBR measurements based on a filter coefficient (a) applied to a previous CBR value.

The congestion controller 146 may receive the CBR value from the measurement component 144 and determine a CR limit 1160. The CR limit 1160 may limit values for one or more of a MCS table or indices, a number of sub-channels, a number of retransmissions, or a transmission power. The congestion controller 146 may provide the CR limit 1160 to the transmission component 148.

The transmission component 148 may determine transmission parameters based on the CR limit 1160, an amount of data, and channel conditions. For example, the transmission component 148 may select an MCS, a number of sub-channels, a number of retransmissions, and a transmission power that satisfies the CR limit 1160. The transmission component 148. The transmission component 148 may provide the sidelink signals for transmission and the transmission parameters to the transmitter component 1112 for transmission.

Figure 13:
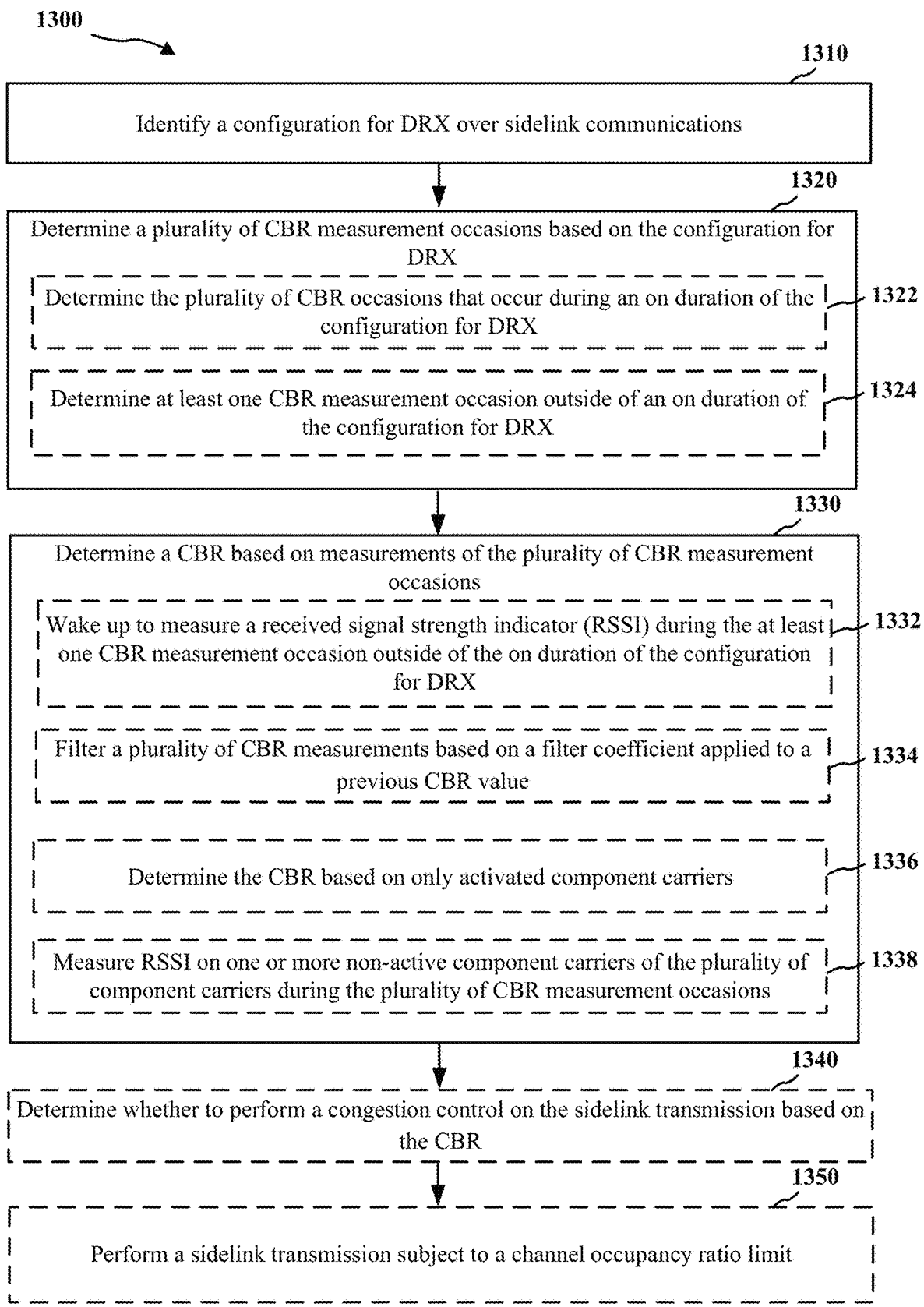
FIG. 13 is a flowchart of an example method for operating a UE for sidelink transmission with congestion control according to a DRX configuration.

FIG. 13 is a flowchart of an example method 1300 for operating a UE 104 (e.g., the first UE 104-a) for sidelink transmission according to a DRX configuration with congestion control. The method 1300 may be performed by a UE (such as the UE 104, which may include the memory 360 and which may be the entire UE 104 or a component of the UE 104 such as the sidelink CBR component 140, the TX processor 368, the RX processor 356, or the controller/processor 359). The method 1300 may be performed by the sidelink CBR component 140 in communication with the sidelink configuration component 198 of the base station 102 and the sidelink CBR component 140 of another UE 104.

At block 1310, the method 1300 may include identifying a configuration for DRX over sidelink communications. In an aspect, for example, the UE 104, the TX processor 368 and/or the controller/processor 359 may execute the sidelink CBR component 140, the receiver component 1110, and/or the configuration component 142 to identify the configuration for DRX (e.g., DRX configuration 1140) for sidelink communications. For example, the sidelink communications may include direct communications with at least a second UE 104-b. The sidelink communications may include groupcast communications with a group of UEs or broadcast communications where one or more receiving UEs are unknown. In an aspect, the receiver component 1110 and/or the configuration component 142 may receive the DRX configuration 1140 from the base station 102 (e.g., within SL configuration 1120). In another aspect, the DRX configuration 1140 may be a default configuration defined by a standards document or regulation. Accordingly, the UE 104, the RX processor 356, and/or the controller/processor 359 executing the sidelink CBR component 140, the receiver component 1110, and/or the configuration component 142 may provide means for identifying a configuration for DRX over sidelink communications.

At block 1320, the method 1300 may include determining a plurality of CBR measurement occasions based on the configuration for DRX. In an aspect, for example, the UE 104, the TX processor 368 and/or the controller/processor 359 may execute the sidelink CBR component 140 and/or the configuration component 142 to determine a plurality of CBR measurement occasions 810 based on the configuration for DRX. For example, at sub-block 1322, the configuration component 142 may determine the plurality of CBR measurement occasions that occur during an on duration of the configuration for DRX. That is, the configuration component 142 may select CBR measurement occasions 810 that occur during the DRX on duration 422. Additionally, when the UE 104 is configured with WUS, the configuration component 142 may select CBR measurement occasions 810 that occur when the UE 104 is awake. As another example, at sub-block 1324, the configuration component 142 may determine at least one CBR measurement occasion outside of an on duration of the configuration for DRX. For example, the configuration component 142 may select at least one CBR measurement occasion 810 during the DRX off duration 424. Accordingly, the UE 104, the RX processor 356, and/or the controller/processor 359 executing the sidelink CBR component 140 and/or the configuration component 142 may provide means for determining a plurality of CBR measurement occasions based on the configuration for DRX.

At block 1330, the method 1300 may include determining a CBR based on measurements of the plurality of CBR measurement occasions. In an aspect, for example, the UE 104, the RX processor 356 and/or the controller/processor 359 may execute the sidelink CBR component 140 and/or the measurement component 144 to determine the CBR based on measurements (e.g., CBR measurements 1132) of the plurality of CBR measurement occasions 810. For example, the measurement component 144 may measure the plurality of CBR measurement occasions 810 within a time window 820 prior to a sidelink transmission 830 based on the configuration for DRX. CBR measurement occasions. For example, the measurement component 144 may measure received signals during each of the CBR measurement occasions 810 to determine an RSSI for each CBR occasion. In an aspect, the plurality of CBR measurement occasions is periodic. In another aspect, the plurality of CBR measurement occasions is pseudo-random. The plurality of CBR measurement occasions may be configured by the first UE to include at least a minimum number of slots within the time window (e.g., time window 710 or 820). In an aspect, the UE 104 may be configured with sidelink carrier aggregation for a plurality of component carriers. The CBR measurement occasions 712 or 810 may be configured separately for each component carrier of the plurality of component carriers. Alternatively, the CBR measurement occasions may be configured jointly for the plurality of component carriers.

In an aspect, in sub-block 1332, the block 1330 may include waking up to measure a RSSI during the at least one CBR measurement occasion outside of the on duration of the configuration for DRX. For example, the sub-block 1332 may be performed in response to the sub-block 1324. For example, the measurement component 144 may wake up the receiver component 1110 to measure the sidelink signals on a CBR measurement occasion 810 that occurs during a DRX off duration 424. In an aspect, in sub-block 1334, the block 1330 may include filtering a plurality of CBR measurements based on a filter coefficient (a) applied to a previous CBR value. For example, the measurement component 144 may filter the plurality of CBR measurements according to equation (1) above. In another aspect, where the UE 104 is configured with sidelink carrier aggregation, at sub-block 1336, the block 1330 may include determining the CBR based on only activated component carriers. Alternatively, in sub-block 1338, the block 1330 may include measuring RSSI on one or more non-active component carriers of the plurality of component carriers during the plurality of CBR measurement occasions 810. In view of the foregoing, the UE 104, the RX processor 356, the TX processor 368, and/or the controller/processor 359 executing the sidelink CBR component 140 and/or the measurement component 144 may provide means for determining a CBR based on measurements of the plurality of CBR measurement occasions.

At block 1340, the method 1300 may optionally include determining whether to perform a congestion control on the sidelink transmission based on the CBR. In an aspect, for example, the UE 104, the TX processor 368 and/or the controller/processor 359 may execute the sidelink CBR component 140 and/or the congestion controller 146 to determine whether to perform a congestion control on the sidelink transmission 1138 based on the CBR 1150. Accordingly, the UE 104, the TX processor 368, and/or the controller/processor 359 executing the sidelink CBR component 140 and/or the congestion controller 146 may provide means for determining whether to perform a congestion control on the sidelink transmission based on the CBR.

At block 1350, the method 1300 may optionally include performing a sidelink transmission subject to a channel occupancy ratio limit. In an aspect, for example, the UE 104, the TX processor 368 and/or the controller/processor 359 may execute the sidelink CBR component 140 and/or the transmission component 148 to perform the sidelink transmission 1138 subject to a channel occupancy ratio limit (e.g., CR limit 1160). The CR limit 1160 may provide congestion control by limiting the resources used by the first UE 104-a. Accordingly, the UE 104, the TX processor 368, and/or the controller/processor 359 executing the sidelink CBR component 140 and/or the transmission component 148 may provide means for performing a sidelink transmission subject to a channel occupancy ratio limit.

Figure 14:
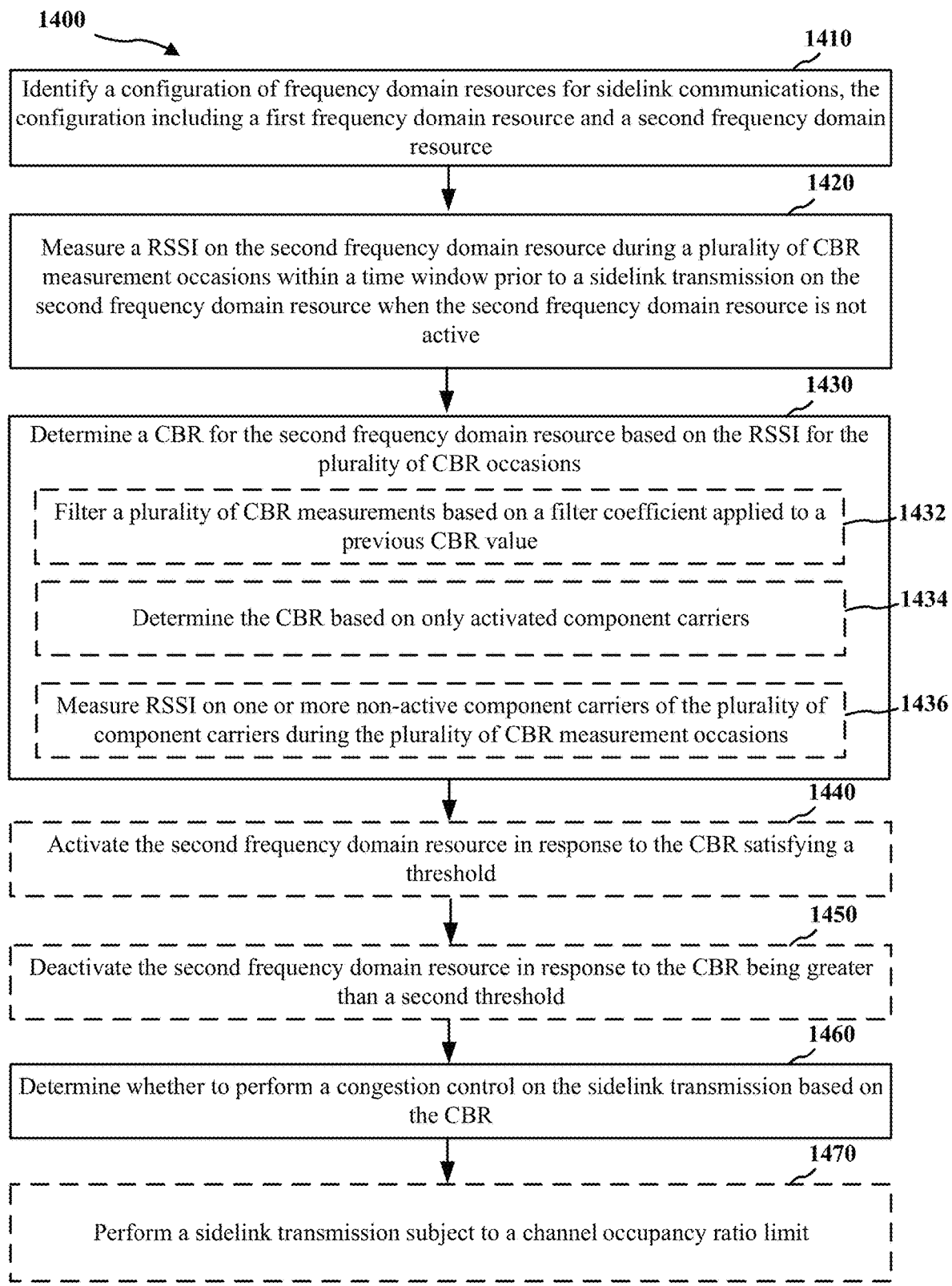
FIG. 14 is a flowchart of an example method for operating a UE for sidelink transmission with congestion control according to a frequency domain configuration with multiple frequency domain resources.

FIG. 14 is a flowchart of an example method 1400 for operating a UE 104 (e.g., the first UE 104-a) for sidelink transmission with congestion control according to a frequency domain configuration with multiple frequency domain resources. The method 1400 may be performed by a UE (such as the UE 104, which may include the memory 360 and which may be the entire UE 104 or a component of the UE 104 such as the sidelink CBR component 140, the TX processor 368, the RX processor 356, or the controller/processor 359). The method 1300 may be performed by the sidelink CBR component 140 in communication with the sidelink configuration component 198 of the base station 102 and the sidelink CBR component 140 of another UE 104.

At block 1410, the method 1400 may include identifying a configuration of frequency domain resources for sidelink communications, the configuration including a first frequency domain resource and a second frequency domain resource. In an aspect, for example, the UE 104, the TX processor 368 and/or the controller/processor 359 may execute the sidelink CBR component 140 and/or the configuration component 142 to identifying the configuration of frequency domain resources (e.g., frequency domain resource configuration 1142) for sidelink communications. For example, the sidelink communications may include unicast, groupcast, or broadcast communications with at least a second UE 104-b. The frequency domain resource configuration 1142 may include a first frequency domain resource 910 or 1010 and a second frequency domain resource 912 or 1012. For example, the configuration component 142 may receive the frequency domain resource configuration 1142 from the base station 102 (e.g., within SL configuration 1120). Accordingly, the UE 104, the RX processor 356, and/or the controller/processor 359 executing the sidelink CBR component 140 and/or the configuration component 142 may provide means for identifying a configuration of frequency domain resources for sidelink communications with a second UE.

At block 1420, the method 1400 may include measuring a RSSI on the second frequency domain resource during a plurality of CBR measurement occasions within a time window prior to a sidelink transmission on the second frequency domain resource when the second frequency domain resource is not active. In an aspect, for example, the UE 104, the RX processor 356 and/or the controller/processor 359 may execute the sidelink CBR component 140 and/or the measurement component 144 to measure the RSSI 1152 on the second frequency domain resource 912 or 1012 during a plurality of CBR measurement occasions 920 within a time window 922 prior to a sidelink transmission 932 on the second frequency domain resource 912 when the second frequency domain resource is not active. For example, the measurement component 144 may measure received signals during each of the CBR measurement occasions to determine an RSSI 1152 for each CBR occasion. In an aspect, the plurality of CBR measurement occasions is periodic. In another aspect, the plurality of CBR measurement occasions is pseudo-random. The plurality of CBR measurement occasions may be configured by the first UE to include at least a minimum number of slots within the time window (e.g., time window 922). In an aspect, the UE 104 may be configured with direct link carrier aggregation for a plurality of component carriers. The CBR measurement occasions 712 or 810 may be configured separately for each component carrier of the plurality of component carriers. Alternatively, the CBR measurement occasions may be configured jointly for the plurality of component carriers.

In view of the foregoing, the UE 104, the RX processor 356, the TX processor 368, and/or the controller/processor 359 executing the sidelink CBR component 140 and/or the measurement component 144 may provide means for measuring a received signal strength indicator (RSSI) on the second frequency domain resource during a plurality of CBR measurement occasions within a time window prior to a direct link transmission on the second frequency domain resource when the second frequency domain resource is not active.

At block 1430, the method 1400 may include determining a CBR for the second frequency domain resource based on the RSSI for the plurality of CBR measurement occasions. In an aspect, for example, the UE 104, the RX processor 356 and/or the controller/processor 359 may execute the sidelink CBR component 140 and/or the measurement component 144 to determine the CBR 1150 for the second frequency domain resource based on the RSSI 1152 for the plurality of CBR measurement occasions. In an aspect, at sub-block 1432, the block 1430 may include filtering a plurality of CBR measurements based on a filter coefficient (a) applied to a previous CBR value. For example, the measurement component 144 may filter the plurality of CBR measurements according to equation (1) above. In an aspect, where the UE 104 is configured with sidelink carrier aggregation, at sub-block 1434, the block 1430 may include determining the CBR based on only activated component carriers. Alternatively, in sub-block 1436, the block 1430 may include measuring RSSI on one or more non-active component carriers of the plurality of component carriers during the plurality of CBR measurement occasions. In view of the foregoing, the UE 104, the RX processor 356, the Tx processor 368, and/or the controller/processor 359 executing the sidelink CBR component 140 and/or the measurement component 144 may provide means for measuring a RSSI on the second frequency domain resource during a plurality of CBR measurement occasions within a time window prior to a direct link transmission on the second frequency domain resource when the second frequency domain resource is not active.

At block 1440, the method 1400 may optionally include activating the second frequency domain resource in response to the CBR satisfying a threshold. In an aspect, for example, the UE 104, the TX processor 368 and/or the controller/processor 359 may execute the sidelink CBR component 140 and/or the congestion controller 146 to activate the second frequency domain resource 912, 1012 in response to the CBR satisfying a threshold. For example, the congestion controller 146 may determine to activate the second frequency domain resource 912, 1012 in response to the measured CBR 1150 being less than the first threshold. The first threshold may be configured via the frequency domain resource configuration 1142. Accordingly, the UE 104, the TX processor 368, and/or the controller/processor 359 executing the sidelink CBR component 140 and/or the congestion controller 146 may provide means for activating the second frequency domain resource in response to the CBR satisfying a threshold.

At block 1450, the method 1400 may optionally include deactivating the second frequency domain resource in response to the CBR being greater than a second threshold. In an aspect, for example, the UE 104, the TX processor 368 and/or the controller/processor 359 may execute the sidelink CBR component 140 and/or the congestion controller 146 to deactivate the second frequency domain resource 912, 1012 in response to the CBR 1150 being greater than a second threshold. The second threshold may be configured via the frequency domain resource configuration 1142. In an aspect, the congestion controller 146 may switch from the second frequency domain resource 1012 to a third frequency domain resource 1014 when deactivating the second frequency domain resource 1012. Accordingly, the UE 104, the TX processor 368, and/or the controller/processor 359 executing the sidelink CBR component 140 and/or the congestion controller 146 may provide means for activating the second frequency domain resource in response to the CBR satisfying a threshold.

At block 1460, the method 1400 may optionally include determining whether to perform a congestion control on the direct link transmission based on the CBR. In an aspect, for example, the UE 104, the TX processor 368 and/or the controller/processor 359 may execute the sidelink CBR component 140 and/or the congestion controller 146 to determine whether to perform a congestion control on the direct link transmission 1138 based on the CBR 1150. Accordingly, the UE 104, the TX processor 368, and/or the controller/processor 359 executing the sidelink CBR component 140 and/or the congestion controller 146 may provide means for determining whether to perform a congestion control on the direct link transmission based on the CBR.

At block 1470, the method 1400 may optionally include performing a direct link transmission subject to a channel occupancy ratio limit. In an aspect, for example, the UE 104, the TX processor 368 and/or the controller/processor 359 may execute the sidelink CBR component 140 and/or the transmission component 148 to perform the direct link transmission 1138 subject to a channel occupancy ratio limit (e.g., CR limit 1160). Accordingly, the UE 104, the TX processor 368, and/or the controller/processor 359 executing the sidelink CBR component 140 and/or the transmission component 148 may provide means for performing a direct link transmission subject to a channel occupancy ratio limit.

Some Further Example Clauses

Implementation examples are described in the following numbered clauses:

1. A method of wireless communication, comprising, at a first user equipment (UE):
   identifying a configuration for discontinuous reception (DRX) over sidelink communications;
   determining a plurality of channel busy ratio (CBR) measurement occasions based on the configuration for DRX; and
   determining a CBR based on measurements of the plurality of CBR measurement occasions.

2. The method of clause 1, wherein determining the plurality of CBR measurement occasions comprises determining the plurality of CBR measurement occasions that occur during an on duration of the configuration for DRX.

3. The method of clause 1, wherein determining the plurality of CBR measurement occasions comprises determining at least one CBR measurement occasion outside of an on duration of the configuration for DRX, and wherein determining the CBR based on measurements of the plurality of CBR measurement occasions comprises waking up to measure a received signal strength indicator (RSSI) during the at least one CBR measurement occasion outside of the on duration of the configuration for DRX.

4. The method of any of clauses 1-3, wherein the plurality of CBR measurement occasions is periodic.

5. The method of any of clauses 1-3, wherein the plurality of CBR measurement occasions is pseudo-random.

6. The method of any of clauses 1-5, wherein determining the CBR comprises filtering a plurality of CBR measurements based on a filter coefficient applied to a previous CBR value.

7. The method of any of clauses 1-6, wherein the first UE is configured with sidelink carrier aggregation for a plurality of component carriers and the plurality of CBR measurement occasions is configured separately for each component carrier of the plurality of component carriers.

8. The method of any of clauses 1-6, wherein the first UE is configured with sidelink carrier aggregation for a plurality of component carriers and the plurality of CBR measurement occasions is configured jointly for the plurality of component carriers.

9. The method of any of clauses 1-8, wherein the first UE is configured with sidelink carrier aggregation for a plurality of component carriers and wherein determining the CBR comprises determining the CBR based on only activated component carriers.

10. The method of any of clauses 1-8, wherein the first UE is configured with sidelink carrier aggregation for a plurality of component carriers, and wherein determining the CBR comprises measuring a RSSI on one or more non-active component carriers of the plurality of component carriers during the plurality of CBR measurement occasions.

11. The method of any of clauses 1-10, wherein the plurality of CBR measurement occasions is configured by the first UE to include at least a minimum number of slots within a time window prior to a sidelink transmission.

12. The method of any of clauses 1-11, further comprising determining whether to perform a congestion control on a sidelink transmission based on the CBR.

13. An apparatus for wireless communication for a first user equipment (UE), comprising:
   a memory storing computer-executable instructions; and
   at least one processor coupled to the memory and configured to execute the computer-executable instructions to:
     identify a configuration for discontinuous reception (DRX) over sidelink communications;
     determine a plurality of channel busy ratio (CBR) measurement occasions based on the configuration for DRX; and
     determine a CBR based on measurements of the plurality of CBR measurement occasions.

14. The apparatus of clause 13, wherein the at least one processor is configured to determine the plurality of CBR measurement occasions to occur during an on duration of the configuration for DRX.

15. The apparatus of clause 13, wherein the at least one processor is configured to:
   determine at least one CBR measurement occasion outside of an on duration of the configuration for DRX; and
   wakeup to measure a received signal strength indicator (RSSI) during the at least one CBR measurement occasion outside of the on duration of the configuration for DRX.

16. The apparatus of any of clauses 13-15, wherein the plurality of CBR measurement occasions is periodic.

17. The apparatus of any of clauses 13-15, wherein the plurality of CBR measurement occasions is pseudo-random.

18. The apparatus of any of clauses 13-17, wherein the at least one processor is configured to filter a plurality of CBR measurements based on a filter coefficient applied to a previous CBR value.

19. The apparatus of any of clauses 13-18, wherein the first UE is configured with sidelink carrier aggregation for a plurality of component carriers and the plurality of CBR measurement occasions is configured separately for each component carrier of the plurality of component carriers.

20. The apparatus of any of clauses 13-18, wherein the first UE is configured with sidelink carrier aggregation for a plurality of component carriers and the plurality of CBR measurement occasions is configured jointly for the plurality of component carriers.

21. The apparatus of any of clauses 13-20, wherein the first UE is configured with sidelink carrier aggregation for a plurality of component carriers and wherein the at least one processor is configured to determine the CBR based on only activated component carriers.

22. The apparatus of any of clauses 13-20, wherein the first UE is configured with sidelink carrier aggregation for a plurality of component carriers, and wherein the at least one processor is configured to determine measure a RSSI on one or more non-active component carriers of the plurality of component carriers during the plurality of CBR measurement occasions.

23. The apparatus of any of clauses 13-22, wherein the plurality of CBR measurement occasions is configured by the first UE to include at least a minimum number of slots within a time window prior to a sidelink transmission.

24. The apparatus of any of clauses 13-23, wherein the at least one processor is configured to determine whether to perform a congestion control on a sidelink transmission based on the CBR.

25. An apparatus for wireless communication for a first user equipment (UE), comprising:
   means for identifying a configuration for discontinuous reception (DRX) over sidelink communications;
   means for determining a plurality of channel busy ratio (CBR) measurement occasions based on the configuration for DRX; and
   means for determining a CBR based on measurements of the plurality of CBR measurement occasions.

26. The apparatus of clause 25, wherein the means for determining the plurality of CBR measurement occasions is configured to determine the plurality of CBR measurement occasions that occur during an on duration of the configuration for DRX.

27. The apparatus of clause 25, wherein the means for determining the plurality of CBR measurement occasions is configured to determine at least one CBR measurement occasion outside of an on duration of the configuration for DRX, and wherein the means for determining the CBR based on measurements of the plurality of CBR measurement occasions is configured to wake up to measure a received signal strength indicator (RSSI) during the at least one CBR measurement occasion outside of the on duration of the configuration for DRX.

28. The apparatus of any of clauses 25-27, wherein the plurality of CBR measurement occasions is periodic.

29. The apparatus of any of clauses 25-27, wherein the plurality of CBR measurement occasions is pseudo-random.

30. The apparatus of any of clauses 25-29, wherein the means for determining the CBR is configured to filter a plurality of CBR measurements based on a filter coefficient applied to a previous CBR value.

31. The apparatus of any of clauses 25-30, wherein the first UE is configured with sidelink carrier aggregation for a plurality of component carriers and the plurality of CBR measurement occasions is configured separately for each component carrier of the plurality of component carriers.

32. The apparatus of any of clauses 25-30, wherein the first UE is configured with sidelink carrier aggregation for a plurality of component carriers and the plurality of CBR measurement occasions is configured jointly for the plurality of component carriers.

33. The apparatus of any of clauses 25-32, wherein the first UE is configured with sidelink carrier aggregation for a plurality of component carriers and wherein the means for determining the CBR is configured to determine the CBR based on only activated component carriers.

34. The apparatus of any of clauses 25-32, wherein the first UE is configured with sidelink carrier aggregation for a plurality of component carriers, and wherein the means for determining the CBR is configured to measure a RSSI on one or more non-active component carriers of the plurality of component carriers during the plurality of CBR measurement occasions.

35. The apparatus of any of clauses 25-34, wherein the plurality of CBR measurement occasions is configured by the first UE to include at least a minimum number of slots within a time window prior to a sidelink transmission.

36. The apparatus of any of clauses 25-35, further comprising means for determining whether to perform a congestion control on a sidelink transmission based on the CBR.

37. A non-transitory computer-readable medium storing computer-executable code that when executed by at least one processor causes the at least one processor to, at a first user equipment (UE):
   identify a configuration for discontinuous reception (DRX) over sidelink communications;
   determine a plurality of channel busy ratio (CBR) measurement occasions based on the configuration for DRX; and
   determine a CBR based on measurements of the plurality of CBR measurement occasions.

38. The non-transitory computer-readable medium of clause 37, wherein the code to determine the plurality of CBR measurement occasions comprises code to determine the plurality of CBR measurement occasions that occur during an on duration of the configuration for DRX.

39. The non-transitory computer-readable medium of clause 37, wherein the code to determine the plurality of CBR measurement occasions comprises code to determine at least one CBR measurement occasion outside of an on duration of the configuration for DRX, and wherein determining the CBR based on measurements of the plurality of CBR measurement occasions comprises waking up to measure a received signal strength indicator (RSSI) during the at least one CBR measurement occasion outside of the on duration of the configuration for DRX.

40. The non-transitory computer-readable medium of any of clauses 37-39, wherein the plurality of CBR measurement occasions is periodic.

41. The non-transitory computer-readable medium of any of clauses 37-39, wherein the plurality of CBR measurement occasions is pseudo-random.

42. The non-transitory computer-readable medium of any of clauses 37-41, wherein the code to determine the CBR comprises code to filter a plurality of CBR measurements based on a filter coefficient applied to a previous CBR value.

43. The non-transitory computer-readable medium of any of clauses 37-42, wherein the first UE is configured with sidelink carrier aggregation for a plurality of component carriers and the plurality of CBR measurement occasions is configured separately for each component carrier of the plurality of component carriers.

44. The non-transitory computer-readable medium of any of clauses 37-42, wherein the first UE is configured with sidelink carrier aggregation for a plurality of component carriers and the plurality of CBR measurement occasions is configured jointly for the plurality of component carriers.

45. The non-transitory computer-readable medium of any of clauses 37-44, wherein the first UE is configured with sidelink carrier aggregation for a plurality of component carriers and wherein the code to determine the CBR comprises code to determine the CBR based on only activated component carriers.

46. The non-transitory computer-readable medium of any of clauses 37-44, wherein the first UE is configured with sidelink carrier aggregation for a plurality of component carriers, and wherein the code to determine the CBR comprises code to measure a RSSI on one or more non-active component carriers of the plurality of component carriers during the plurality of CBR measurement occasions.

47. The non-transitory computer-readable medium of any of clauses 37-46, wherein the plurality of CBR measurement occasions is configured by the first UE to include at least a minimum number of slots within a time window prior to a sidelink transmission.

48. The non-transitory computer-readable medium of any of clauses 37-47, further comprising code to determine whether to perform a congestion control on a sidelink transmission based on the CBR.

49. A method of wireless communication, comprising, at a first user equipment (UE):
  identifying a configuration of frequency domain resources for sidelink communications, the configuration including a first frequency domain resource and a second frequency domain resource;
  measuring a received signal strength indicator (RSSI) on the second frequency domain resource during a plurality of channel busy ratio (CBR) occasions within a time window prior to a sidelink transmission on the second frequency domain resource when the second frequency domain resource is not active; and
  determining a CBR for the second frequency domain resource based on the RSSI for the plurality of CBR measurement occasions.

50. The method of clause 49, further comprising determining to activate the second frequency domain resource in response to the CBR satisfying a first threshold.

51. The method of clause 50, further comprising determining to deactivate the second frequency domain resource in response to the CBR being greater than a second threshold.

52. The method of any of clauses 49-51, wherein the plurality of CBR measurement occasions is periodic.

53. The method of any of clauses 49-51, wherein the plurality of CBR measurement occasions is pseudo-random.

54. The method of any of clauses 49-53, wherein determining the CBR comprises filtering a plurality of CBR measurements based on a filter coefficient applied to a previous CBR value.

55. The method of any of clauses 49-54, wherein the plurality of CBR measurement occasions is configured by the first UE to include at least a minimum number of slots within the time window.

56. The method of any of clauses 49-55, further comprising determining whether to perform a congestion control on the sidelink transmission based on the CBR.

57. The method of any of clauses 49-56, wherein the first frequency domain resource is a first component carrier, a first bandwidth part, or a first resource pool and the second frequency domain resource is a second component carrier, a second bandwidth part, or a second resource pool.

58. The method of any of clauses 49-57, wherein the first UE is configured with sidelink carrier aggregation for a plurality of component carriers and wherein determining the CBR comprises determining the CBR based on only activated component carriers.

59. The method of any of clauses 49-57, wherein the first UE is configured with sidelink carrier aggregation for a plurality of component carriers, and wherein determining the CBR comprises measuring the RSSI on one or more non-active component carriers of the plurality of component carriers during the plurality of CBR measurement occasions.

60. An apparatus for wireless communication for a first user equipment (UE), comprising:
  a memory storing computer-executable instructions; and
  at least one processor coupled to the memory and configured to execute the computer-executable instructions to:
    identify a configuration of frequency domain resources for sidelink communications, the configuration including a first frequency domain resource and a second frequency domain resource;
    measure a received signal strength indicator (RSSI) on the second frequency domain resource during a plurality of channel busy ratio (CBR) occasions within a time window prior to a sidelink transmission on the second frequency domain resource when the second frequency domain resource is not active; and
    determine a CBR for the second frequency domain resource based on the RSSI for the plurality of CBR measurement occasions.

61. The apparatus of clause 60, wherein the at least one processor is configured to activate the second frequency domain resource in response to the CBR satisfying a first threshold.

62. The apparatus of clause 61, wherein the at least one processor is configured to deactivate the second frequency domain resource in response to the CBR being greater than a second threshold.

63. The apparatus of any of clauses 60-62, wherein the plurality of CBR measurement occasions is periodic.

64. The apparatus of any of clauses 60-62, wherein the plurality of CBR measurement occasions is pseudo-random.

65. The apparatus of any of clauses 60-64, wherein the at least one processor is configured to filter a plurality of CBR measurements based on a filter coefficient applied to a previous CBR value.

66. The apparatus of any of clauses 60-65, wherein the plurality of CBR measurement occasions is configured by the first UE to include at least a minimum number of slots within the time window.

67. The apparatus of any of clauses 60-66, wherein the at least one processor is configured to determine whether to perform a congestion control on the sidelink transmission based on the CBR.

68. The apparatus of any of clauses 60-67, wherein the first frequency domain resource is a first component carrier, a first bandwidth part, or a first resource pool and the second frequency domain resource is a second component carrier, a second bandwidth part, or a second resource pool.

69. The apparatus of any of clauses 60-68, wherein the first UE is configured with sidelink carrier aggregation for a plurality of component carriers, and wherein the at least one processor is configured to determine the CBR based on only activated component carriers.

70. The apparatus of any of clauses 60-68, wherein the first UE is configured with sidelink carrier aggregation for a plurality of component carriers, and wherein the at least one processor is configured to measure the RSSI on one or more non-active component carriers of the plurality of component carriers during the plurality of CBR measurement occasions.

71. An apparatus for wireless communication for a first user equipment (UE), comprising:
means for identifying a configuration of frequency domain resources for sidelink communications, the configuration including a first frequency domain resource and a second frequency domain resource;
means for measuring a received signal strength indicator (RSSI) on the second frequency domain resource during a plurality of channel busy ratio (CBR) occasions within a time window prior to a sidelink transmission on the second frequency domain resource when the second frequency domain resource is not active; and
means for determining a CBR for the second frequency domain resource based on the RSSI for the plurality of CBR measurement occasions.

72. The apparatus of clause 71, further comprising means for activating the second frequency domain resource in response to the CBR satisfying a first threshold.

73. The apparatus of clause 72, wherein the means for activating is configured to deactivate the second frequency domain resource in response to the CBR being greater than a second threshold.

74. The apparatus of any of clauses 71-73, wherein the plurality of CBR measurement occasions is periodic.

75. The apparatus of any of clauses 71-73, wherein the plurality of CBR measurement occasions is pseudo-random.

76. The apparatus of any of clauses 71-75, wherein the means for determining the CBR is configured to filter a plurality of CBR measurements based on a filter coefficient applied to a previous CBR value.

77. The apparatus of any of clauses 71-77, wherein the plurality of CBR measurement occasions is configured by the first UE to include at least a minimum number of slots within the time window.

78. The apparatus of any of clauses 71-78, further comprising means for determining whether to perform a congestion control on the sidelink transmission based on the CBR.

79. The apparatus of any of clauses 71-79, wherein the first frequency domain resource is a first component carrier, a first bandwidth part, or a first resource pool and the second frequency domain resource is a second component carrier, a second bandwidth part, or a second resource pool.

80. The apparatus of any of clauses 71-80, wherein the first UE is configured with sidelink carrier aggregation for a plurality of component carriers and wherein the means for determining the CBR is configured to determine the CBR based on only activated component carriers.

81. The apparatus of any of clauses 71-80, wherein the first UE is configured with sidelink carrier aggregation for a plurality of component carriers, and wherein the means for determining the CBR is configured to measure the RSSI on one or more non-active component carriers of the plurality of component carriers during the plurality of CBR measurement occasions.

82. A non-transitory computer-readable medium storing computer-executable code that when executed by at least one processor of a first user equipment (UE) causes the at least one processor to:
identify a configuration of frequency domain resources for sidelink communications, the configuration including a first frequency domain resource and a second frequency domain resource;
measure a received signal strength indicator (RSSI) on the second frequency domain resource during a plurality of channel busy ratio (CBR) occasions within a time window prior to a sidelink transmission on the second frequency domain resource when the second frequency domain resource is not active; and
determine a CBR for the second frequency domain resource based on the RSSI for the plurality of CBR measurement occasions.

83. The non-transitory computer-readable medium of clause 82, further comprising determining to activate the second frequency domain resource in response to the CBR satisfying a first threshold.

84. The non-transitory computer-readable medium of clause 83, further comprising determining to deactivate the second frequency domain resource in response to the CBR being greater than a second threshold.

85. The non-transitory computer-readable medium of any of clauses 82-84, wherein the plurality of CBR measurement occasions is periodic.

86. The non-transitory computer-readable medium of any of clauses 82-84, wherein the plurality of CBR measurement occasions is pseudo-random.

87. The non-transitory computer-readable medium of any of clauses 82-86, wherein determining the CBR comprises filtering a plurality of CBR measurements based on a filter coefficient applied to a previous CBR value.

88. The non-transitory computer-readable medium of any of clauses 82-87, wherein the plurality of CBR measurement occasions is configured by the first UE to include at least a minimum number of slots within the time window.

89. The non-transitory computer-readable medium of any of clauses 82-88, further comprising determining whether to perform a congestion control on the sidelink transmission based on the CBR.

90. The non-transitory computer-readable medium of any of clauses 82-89, wherein the first frequency domain resource is a first component carrier, a first bandwidth part, or a first resource pool and the second frequency domain resource is a second component carrier, a second bandwidth part, or a second resource pool.

91. The non-transitory computer-readable medium of any of clauses 82-90, wherein the first UE is configured with sidelink carrier aggregation for a plurality of component carriers and wherein determining the CBR comprises determining the CBR based on only activated component carriers.

92. The non-transitory computer-readable medium of clause any of clauses 82-90, wherein the first UE is configured with sidelink carrier aggregation for a plurality of component carriers, and wherein determining the CBR comprises measuring the RSSI on one or more non-active component carriers of the plurality of component carriers during the plurality of CBR measurement occasions.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising, at a first user equipment (UE):
   identifying a configuration for discontinuous reception (DRX) over sidelink communications;
   determining a plurality of channel busy ratio (CBR) measurement occasions based on the configuration for DRX, wherein determining the plurality of CBR measurement occasions comprises determining at least one CBR measurement occasion outside of an on duration of the configuration for DRX; and
   determining a CBR based on measurements of the plurality of CBR measurement occasions, wherein determining the CBR based on measurements of the plurality of CBR measurement occasions comprises waking up to measure a received signal strength indicator (RSSI) during the at least one CBR measurement occasion outside of the on duration of the configuration for DRX.

2. The method of claim 1, wherein determining the plurality of CBR measurement occasions comprises determining that some of the plurality of CBR measurement occasions occur during an on duration of the configuration for DRX.

3. The method of claim 1, wherein the plurality of CBR measurement occasions is periodic.

4. The method of claim 1, wherein the plurality of CBR measurement occasions is pseudo-random.

5. The method of claim 1, wherein determining the CBR comprises filtering a plurality of CBR measurements based on a filter coefficient applied to a previous CBR value.

6. The method of claim 1, wherein the first UE is configured with sidelink carrier aggregation for a plurality of component carriers and the plurality of CBR measurement occasions is configured separately for each component carrier of the plurality of component carriers.

7. The method of claim 1, wherein the first UE is configured with sidelink carrier aggregation for a plurality of component carriers and the plurality of CBR measurement occasions is configured jointly for the plurality of component carriers.

8. The method of claim 1, wherein the first UE is configured with sidelink carrier aggregation for a plurality of component carriers and wherein determining the CBR comprises determining the CBR based on only activated component carriers.

9. The method of claim 1, wherein the first UE is configured with sidelink carrier aggregation for a plurality of component carriers, and wherein determining the CBR comprises measuring RSSI on one or more non-active component carriers of the plurality of component carriers during the plurality of CBR measurement occasions.

10. The method of claim 1, wherein the plurality of CBR measurement occasions is configured by the first UE to include at least a minimum number of slots within a time window prior to a sidelink transmission.

11. The method of claim 1, further comprising determining whether to perform a congestion control on a sidelink transmission based on the CBR.

12. An apparatus for wireless communication of a first user equipment (UE), comprising:
   a memory storing computer-executable instructions; and
   at least one processor coupled to the memory and configured to execute the computer-executable instructions to:
      identify a configuration for discontinuous reception (DRX) over sidelink communications;
      determine a plurality of channel busy ratio (CBR) measurement occasions based on the configuration for DRX;
      determine at least one CBR measurement occasion outside of an on duration of the configuration for DRX;

wake up to measure a received signal strength indicator (RSSI) during the at least one CBR measurement occasion outside of the on duration of the configuration for DRX; and determine a CBR based on measurements of the plurality of CBR measurement occasions.

13. The apparatus of claim 12, wherein the at least one processor is configured to determine that some of the plurality of CBR measurement occasions occur during an on duration of the configuration for DRX.

14. A method of wireless communication, comprising, at a first user equipment (UE):

identifying a configuration of frequency domain resources for sidelink communications, the configuration including a first frequency domain resource and a second frequency domain resource;

measuring a received signal strength indicator (RSSI) on the second frequency domain resource during a plurality of channel busy ratio (CBR) occasions within a time window prior to a sidelink transmission on the second frequency domain resource when the second frequency domain resource is not active; and determining a CBR for the second frequency domain resource based on the RSSI for the plurality of CBR measurement occasions, wherein the first UE is configured with sidelink carrier aggregation for a plurality of component carriers and wherein determining the CBR comprises determining the CBR based on only activated component carriers.

15. The method of claim 14, further comprising activating the second frequency domain resource in response to the CBR satisfying a first threshold.

16. The method of claim 15, further comprising deactivating the second frequency domain resource in response to the CBR being greater than a second threshold.

17. The method of claim 14, wherein the plurality of CBR measurement occasions is periodic.

18. The method of claim 14, wherein the plurality of CBR measurement occasions is pseudo-random.

19. The method of claim 14, wherein determining the CBR comprises filtering a plurality of CBR measurements based on a filter coefficient applied to a previous CBR value.

20. The method of claim 14, wherein the plurality of CBR measurement occasions is configured by the first UE to include at least a minimum number of slots within the time window.

21. The method of claim 14, further comprising determining whether to perform a congestion control on the sidelink transmission based on the CBR.

22. The method of claim 14, wherein the first frequency domain resource is a first component carrier, a first bandwidth part, or a first resource pool and the second frequency domain resource is a second component carrier, a second bandwidth part, or a second resource pool.

23. An apparatus for wireless communication for a first user equipment (UE), comprising:

a memory storing computer-executable instructions; and at least one processor coupled to the memory and configured to execute the computer-executable instructions to:

identify a configuration of frequency domain resources for sidelink communications, the configuration including a first frequency domain resource and a second frequency domain resource;

measure a received signal strength indicator (RSSI) on the second frequency domain resource during a plurality of channel busy ratio (CBR) occasions within a time window prior to a sidelink transmission on the second frequency domain resource when the second frequency domain resource is not active; and determine a CBR for the second frequency domain resource based on the RSSI for the plurality of CBR measurement occasions, wherein the first UE is configured with sidelink carrier aggregation for a plurality of component carriers, and wherein determining the CBR comprises measuring the RSSI on one or more non-active component carriers of the plurality of component carriers during the plurality of CBR measurement occasions.

24. The apparatus of claim 23, wherein the at least one processor is configured to activate the second frequency domain resource in response to the CBR satisfying a first threshold.

25. The apparatus of claim 23, wherein the plurality of CBR measurement occasions is configured by the first UE to include at least a minimum number of slots within the time window.

26. The apparatus of claim 23, wherein the at least one processor is configured to filter a plurality of CBR measurements based on a filter coefficient applied to a previous CBR value.

* * * * *